United States Patent
Haroush

(10) Patent No.: US 12,502,013 B2
(45) Date of Patent: Dec. 23, 2025

(54) MODULAR PRODUCT DISPLAY SYSTEM

(71) Applicant: Outform Ltd., Moshav Magshimim (IL)

(72) Inventor: Ariel Haroush, North Miami, FL (US)

(73) Assignee: Outform Ltd., Moshav Magshimim (IL)

( * ) Notice: Subject to any disclaimer, the term of this patent is extended or adjusted under 35 U.S.C. 154(b) by 0 days.

(21) Appl. No.: 18/221,493

(22) Filed: Jul. 13, 2023

(65) Prior Publication Data

US 2024/0016316 A1   Jan. 18, 2024

Related U.S. Application Data

(60) Provisional application No. 63/437,748, filed on Jan. 8, 2023, provisional application No. 63/389,228, filed on Jul. 14, 2022.

(51) Int. Cl.
| | |
|---|---|
| *A47F 10/00* | (2006.01) |
| *A47F 5/00* | (2006.01) |
| *G06F 3/0488* | (2022.01) |
| *G06F 3/14* | (2006.01) |

(52) U.S. Cl.
CPC ............ *A47F 5/0081* (2013.01); *A47F 10/00* (2013.01); *G06F 3/1446* (2013.01); *A47F 2010/005* (2013.01); *G06F 3/0488* (2013.01)

(58) Field of Classification Search
CPC .. A47F 5/0081; A47F 2010/005; A47F 10/00; G06F 3/1446; G06F 3/0488
USPC ........................................................ 248/917
See application file for complete search history.

(56) References Cited

U.S. PATENT DOCUMENTS

| | | | | |
|---|---|---|---|---|
| 3,695,452 A | * | 10/1972 | Surman ................... | A47F 7/024 248/116 |
| 4,775,921 A | * | 10/1988 | Foley ..................... | A47F 5/0846 362/147 |
| 6,698,597 B2 | * | 3/2004 | Marihugh ................. | A47F 5/04 211/133.1 |
| 7,392,948 B2 | * | 7/2008 | Smith ................... | G06Q 10/087 340/5.91 |
| 8,474,193 B2 | * | 7/2013 | Sutton .................. | A61G 12/005 52/27 |
| 9,584,753 B2 | * | 2/2017 | Theisen ................. | H04N 23/54 |
| 10,030,853 B2 | * | 7/2018 | Andreasen ............ | F21V 19/004 |
| 10,078,485 B2 | * | 9/2018 | Akatsuka ............... | G09G 5/006 |
| 10,082,997 B2 | * | 9/2018 | Mihara ................. | G06F 3/1446 |
| 10,346,120 B2 | * | 7/2019 | Cho ...................... | H04N 21/431 |
| 10,357,118 B2 | * | 7/2019 | Swafford ............... | A47F 5/0068 |
| 10,416,951 B2 | * | 9/2019 | Park ...................... | G06F 3/1446 |
| 10,504,389 B2 | * | 12/2019 | Tewksbury ............. | A47F 5/005 |
| 10,548,416 B2 | * | 2/2020 | Xu ............................ | G09F 9/33 |
| 10,674,840 B2 | * | 6/2020 | Haroush ................. | A47F 7/024 |
| 10,963,207 B2 | * | 3/2021 | Wickstrum .......... | H05K 5/0017 |
| 11,107,151 B2 | * | 8/2021 | Scalzi ........................ | G09F 9/33 |
| 11,109,692 B2 | * | 9/2021 | Swafford ................ | A47F 10/02 |

(Continued)

*Primary Examiner* — Stanton L Krycinski
(74) *Attorney, Agent, or Firm* — Troutman Pepper Locke LLP; Scott D. Wofsy; Michael J. Pollack

(57) ABSTRACT

Retail display fixtures include a plurality of modular interchangeable surface panels, a base structure having at least one outward-facing surface adapted and configured to receive the plurality of modular interchangeable surface panels, and at least one mechanical connector adapted and configured to secure the plurality of modular interchangeable surface panels to the base structure.

20 Claims, 23 Drawing Sheets

(56) References Cited

U.S. PATENT DOCUMENTS

| | | | |
|---|---|---|---|
| 11,263,933 B2* | 3/2022 | Han | G09F 9/3026 |
| 11,275,549 B2* | 3/2022 | Choi | H04B 10/60 |
| 11,288,028 B2* | 3/2022 | Miles | H02J 7/35 |
| 11,470,731 B1* | 10/2022 | Hochman | H05K 5/0021 |
| 11,580,492 B2* | 2/2023 | Shakkour | G01G 19/42 |
| 11,756,455 B2* | 9/2023 | Oosthoek | G06F 3/14 |
| | | | 340/5.91 |
| 11,853,636 B2* | 12/2023 | Oshima | G06F 3/1446 |
| 2004/0228122 A1* | 11/2004 | Slesinger | A47F 11/10 |
| | | | 362/127 |
| 2007/0037559 A1* | 2/2007 | Kaiserman | H01H 3/141 |
| | | | 455/414.2 |
| 2008/0046345 A1* | 2/2008 | Serre | G06Q 10/087 |
| | | | 211/1 |
| 2008/0204672 A1* | 8/2008 | Ikeda | A47F 3/001 |
| | | | 353/74 |
| 2009/0020601 A1* | 1/2009 | Woodbury | G06Q 10/087 |
| | | | 235/375 |
| 2009/0228795 A1* | 9/2009 | Bass | G06Q 10/087 |
| | | | 715/764 |
| 2010/0001924 A1* | 1/2010 | Nobutsugu | G06Q 30/06 |
| | | | 345/1.1 |
| 2010/0175919 A1* | 7/2010 | Ellis | H01R 25/16 |
| | | | 174/481 |
| 2011/0266232 A1* | 11/2011 | Kahler | H04N 21/482 |
| | | | 386/230 |
| 2011/0283632 A1* | 11/2011 | Sutton | A47B 46/005 |
| | | | 52/36.1 |
| 2011/0288938 A1* | 11/2011 | Cook | G08B 13/1427 |
| | | | 705/14.66 |
| 2012/0044056 A1* | 2/2012 | Byun | G06Q 30/0641 |
| | | | 340/10.1 |
| 2012/0228240 A1* | 9/2012 | Gentile | A47F 5/0823 |
| | | | 211/1 |
| 2013/0226742 A1* | 8/2013 | Johnson | G06Q 30/02 |
| | | | 705/27.1 |
| 2014/0092531 A1* | 4/2014 | Trinh | F16M 11/041 |
| | | | 361/679.01 |
| 2016/0134930 A1* | 5/2016 | Swafford | A47F 5/0068 |
| | | | 725/80 |
| 2019/0191894 A1* | 6/2019 | Xu | F21V 23/001 |
| 2019/0197602 A1* | 6/2019 | Scalzi | G09F 9/33 |
| 2019/0197925 A1* | 6/2019 | Tewksbury | A47F 11/10 |
| 2019/0296579 A1* | 9/2019 | Akatsuka | H02J 50/10 |
| 2020/0133615 A1* | 4/2020 | Kim | G06V 10/245 |
| 2020/0405078 A1* | 12/2020 | Martin | G06Q 30/0255 |
| 2021/0004192 A1* | 1/2021 | Kamiike | H05K 5/0217 |
| 2021/0173606 A1* | 6/2021 | Oosthoek | G09F 3/208 |
| 2022/0415873 A1* | 12/2022 | Chung | H01L 25/162 |

\* cited by examiner

MODULAR PRODUCT DISPLAY SYSTEM

CROSS-REFERENCE TO RELATED APPLICATIONS

This application claims the benefit of priority to U.S. Patent Application Ser. No. 63/389,228, filed Jul. 14, 2022, and U.S. Patent Application Ser. No. 63/437,748, filed Jan. 8, 2023. Each of the foregoing applications is incorporated herein by reference in its entirety.

BACKGROUND OF THE INVENTION

Although generally considered satisfactory for their intended purpose, retail display fixtures, such as racks, shelves and tables have not always maximized the potential of their prominent locations within a retail space.

Applicant recognizes the need, therefore, for visually appealing and functional fixtures, including multimodal and interactive fixtures. The devices, systems and related methods of the present disclosure provide solutions for this need.

SUMMARY OF THE INVENTION

In accordance with the present invention, devices, systems and methods are provided that enhance the retail shopping experience and expand the possibilities available to marketers and retailers.

To these ends, retail display fixtures are provided that include a plurality of interchangeable modules, surface panels or tiles, a base structure having at least one outward-facing surface adapted and configured to receive the plurality of interchangeable surface panels, and at least one mechanical connector adapted and configured to secure the plurality of interchangeable surface panels to the base structure.

An aperture can be formed in at least one of the plurality of interchangeable surface panels, the aperture being adapted and configured to permit penetration of product display hardware therethrough.

A locking element can be provided in connection with the base structure, which is adapted and configured to engage the product display hardware.

Retail display fixtures in accordance with the invention can further include at least one electrical connector adapted and configured to provide electrical power to at least one of the plurality of interchangeable panels.

Retail display fixtures in accordance with the invention can further include at least one data connector adapted and configured to provide data from a controller to at least one of the plurality of interchangeable panels.

If desired, at least one of the interchangeable surface panels can be a digital display. Such digital display can be adapted and configured to receive an input image signal from a controller. If desired, at least one of the interchangeable surface panels can be an opaque panel. If desired, at least one of the interchangeable surface panels can include an illumination source.

Further, the at least one mechanical connector can include a magnetic portion, at least one of the interchangeable surface panels can include at least one sensor, and the sensor can be touch-sensitive, if desired.

Additionally, at least one of the interchangeable surface panels can include a printed insert.

Retail display fixtures in accordance with the invention can further include a separable interactive panel.

Retail display fixtures in accordance with the invention can further include a quick response-code thereon to permit user interaction therewith.

Retail display fixtures in accordance with the invention can be adapted and configured to display user-selected content in response to user input on a user device.

BRIEF DESCRIPTION OF THE DRAWINGS

So that those skilled in the art to which the subject disclosure appertains will readily understand how to make and use the devices, systems and methods of the subject disclosure without undue experimentation, embodiments thereof will be described in detail herein below with reference to certain figures, wherein.

DETAILED DESCRIPTION OF THE INVENTION

Figure 1:
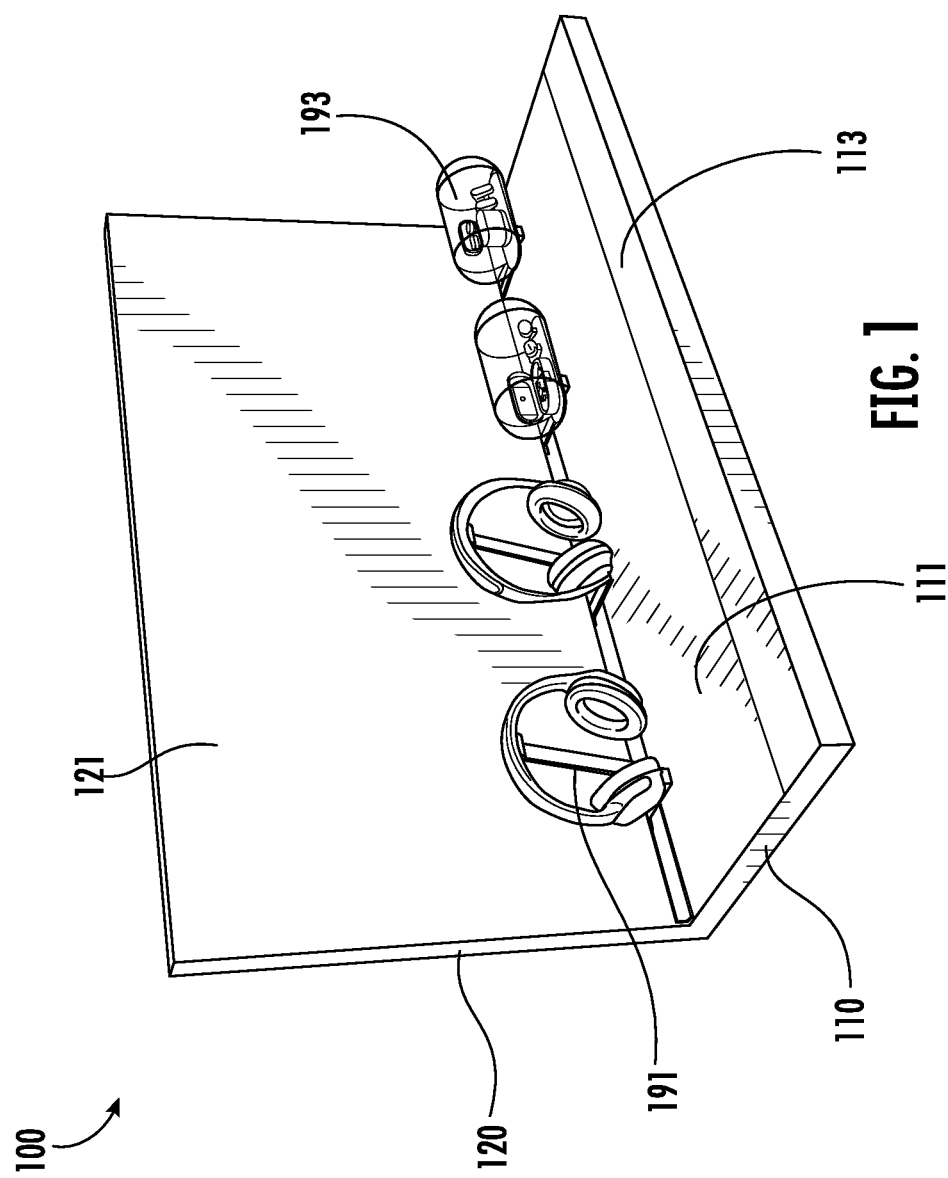
FIG. 1 is an isometric view of a modular product display system with interchangeable tiles, or in short, a retail display fixture, in accordance with a first embodiment of the invention.

Reference will now be made to the drawings wherein like reference numerals identify similar structural features or aspects of the subject disclosure.

Devices, systems and methods are provided that relate to modular product display systems with interchangeable surface panels or tiles. Retail display fixtures in accordance with the present invention can take on various configurations of shape and function, without departing from the spirit or scope of the invention, as can be appreciated by the great flexibility in form and function that the invention inherently provides.

For purposes of explanation and illustration, and not limitation, as illustrated in FIG. 1, and in accordance with one aspect of the present invention, a first embodiment of a retail fixture 100 in accordance with the invention is provided, illustrating a basic three-dimensional form having a lower base 110 and rear wall 120, upon which are mounted modular interchangeable panels, 111, 113 and 121, respectively. Also provided are product display accessories 191 and 193, particular to the items being displayed, which accessories engage the retail fixture 100 where needed, and also securely support and/or protect the product(s) being displayed. In the illustrated embodiment of FIG. 1, a headset support arm 191 and earbud-style headphone display case or capsule 193 are both provided. In the illustrated embodiment, these accessories include a slim distal portion to visually unobtrusively pass through predetermined spaces within the structure of the retail fixture 100, such as spaces remaining between adjacent modules, in order to securely engage the structure thereof.

Figure 2:
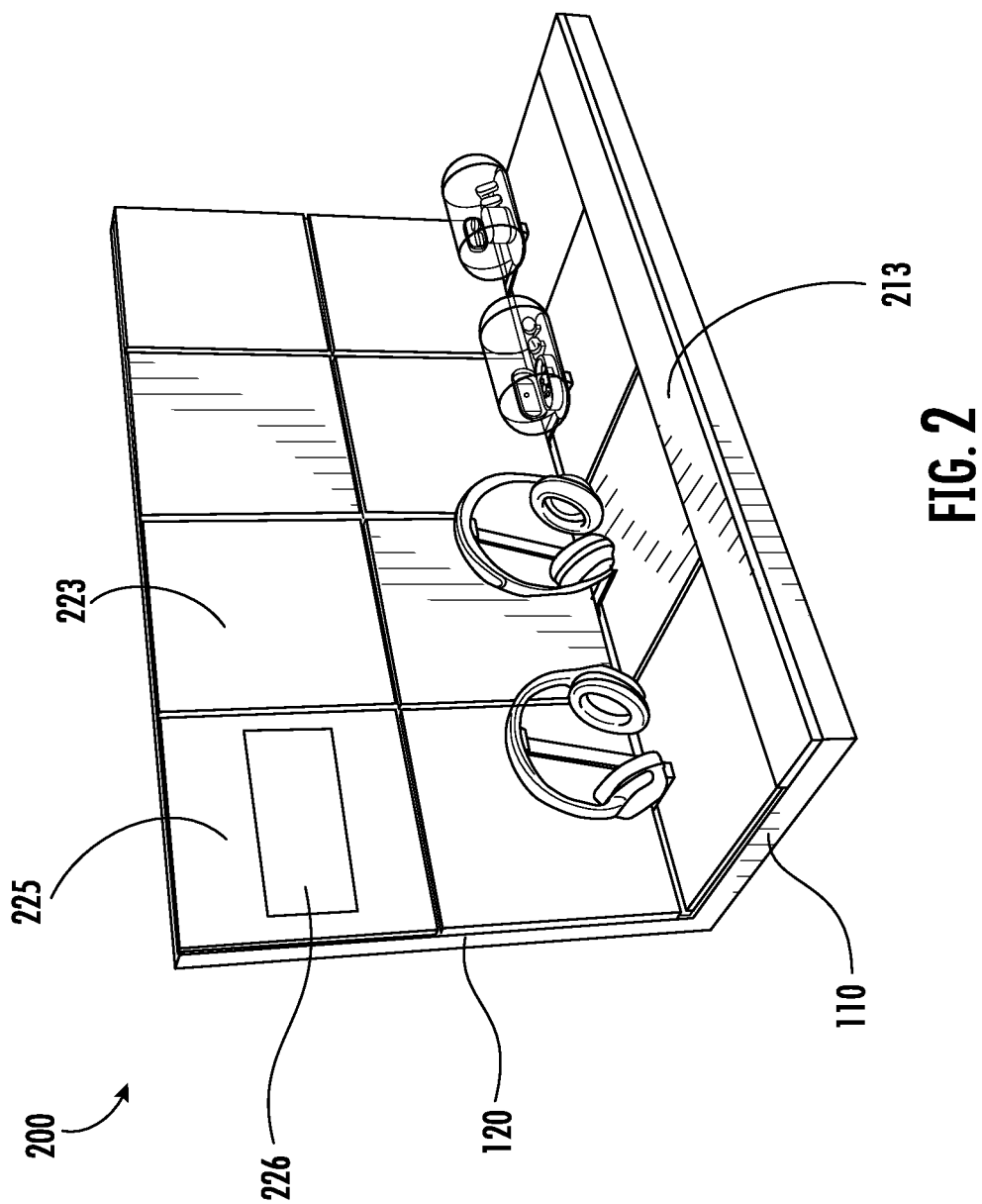
FIG. 2 is an isometric view of a retail display fixture in accordance with a second embodiment of the invention.

FIG. 2 illustrates a further embodiment of a retail fixture 200 in accordance with the invention, similar in overall form to retail fixture 100, also having a base 110 and rear wall 120, with modular interchangeable panels 213, 223 and 225. In the illustrated embodiment, the panels include digital displays 213, 223, 225 varying in form from one another. Functionally, these panels can incorporate different features as will be best appreciated in connection with description of the subsequent figures, described hereinbelow. Features that may be incorporated include video screens, dynamic (digital) or static indicia, as represented by element 226, or interactive sensors, such as proximity, touch, or RFID sensors, which can be incorporated in any module, panel or tile, but which may be particularly advantageous in panels physically closer to a user or customer, such as in forward-mounted linear panel 213. This and other embodiments described herein also include the necessary supportive hardware to power and control the features of respective modules, such as by supplying power and/or sending/receiving data.

Figure 3:
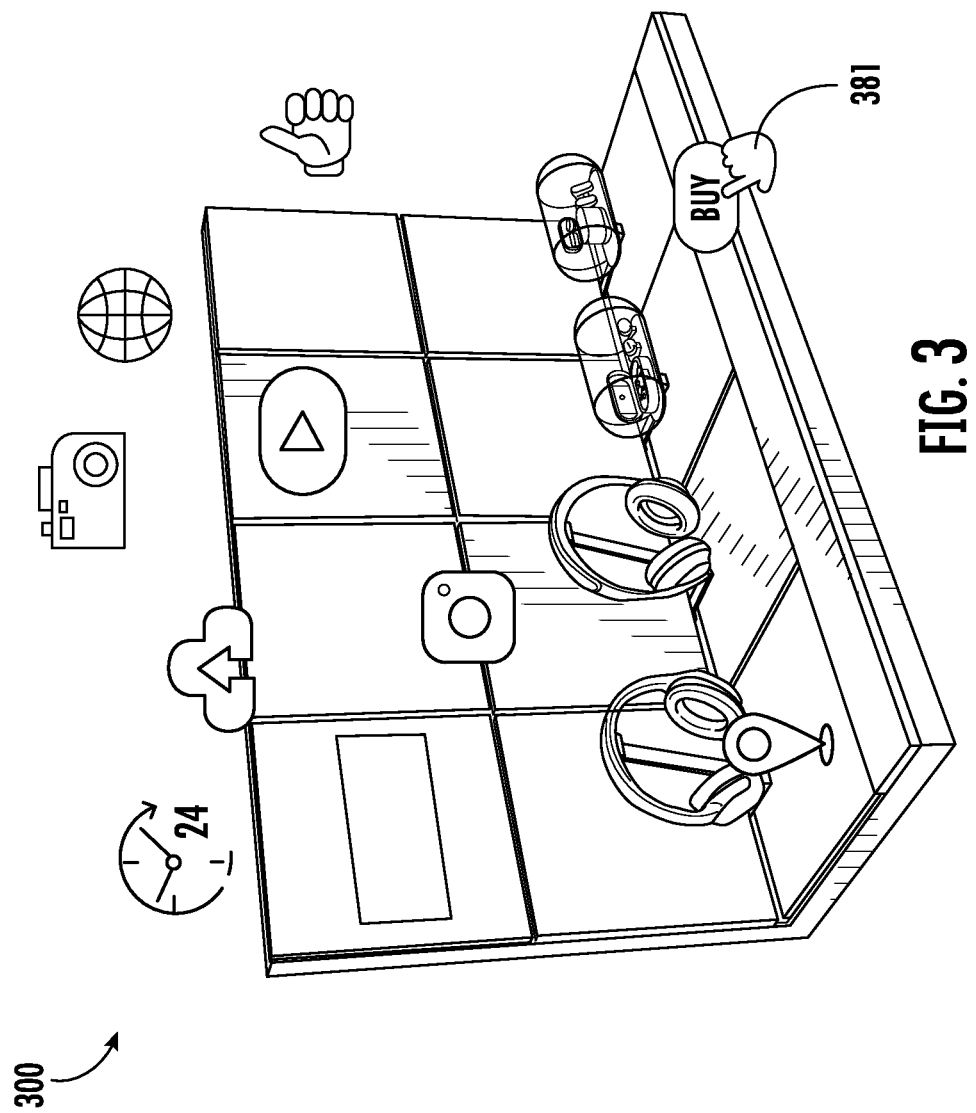
FIG. 3 is an isometric view of a retail display fixture in accordance with a third embodiment of the invention.

FIG. 3 illustrates a further embodiment of a retail fixture 300 in accordance with the invention, similar in overall form to retail fixtures 100 and 200. In the illustrated embodiment, the panels include interactive functional elements 381 for receiving input from and/or providing information to the user.

Figure 4:
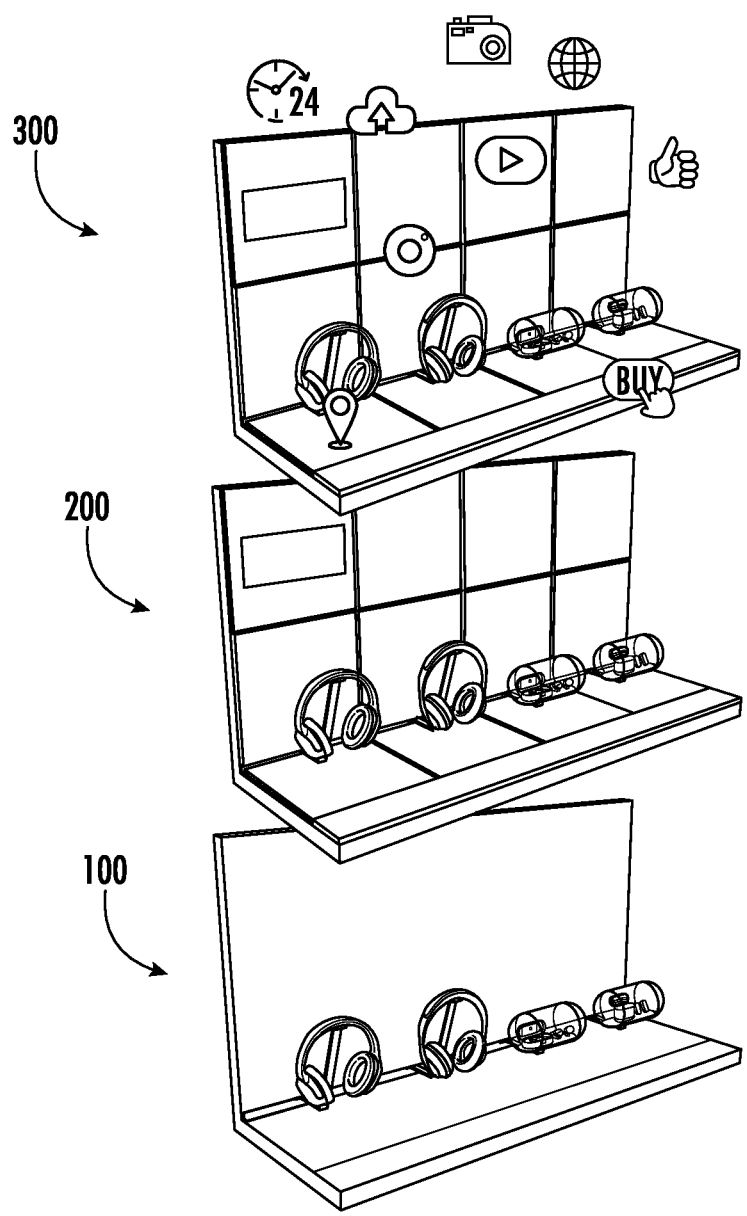
FIG. 4 is an isometric view comparing the first through third embodiments of the invention.

FIG. 4 is an isometric view comparing the first 100, second 200 and third 300 embodiments of the invention, each having the same basic form and supportive base structure.

Figure 5:
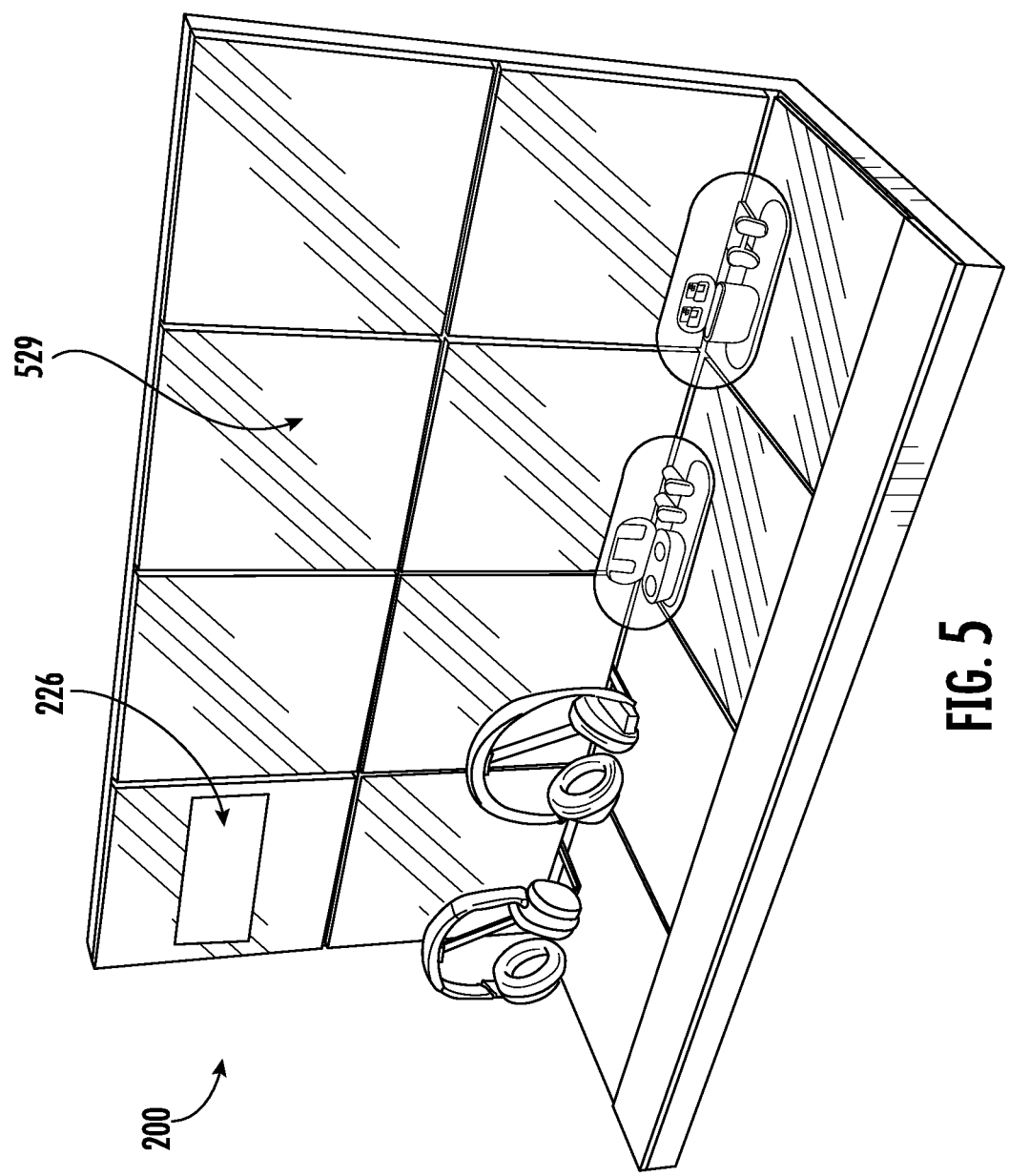
FIG. 5 is an isometric view of a retail display fixture in accordance with the second embodiment of the invention, illustrating the display of an image relevant to the displayed product and placement of brand indicia.

FIG. 5 is an isometric view of a retail display fixture 200, in accordance with a second embodiment of the invention, but illustrating the display of an image 529 relevant to the displayed products 599, product line or brand identity, the indicia 226 for which can be provided when and as needed.

Figure 6:
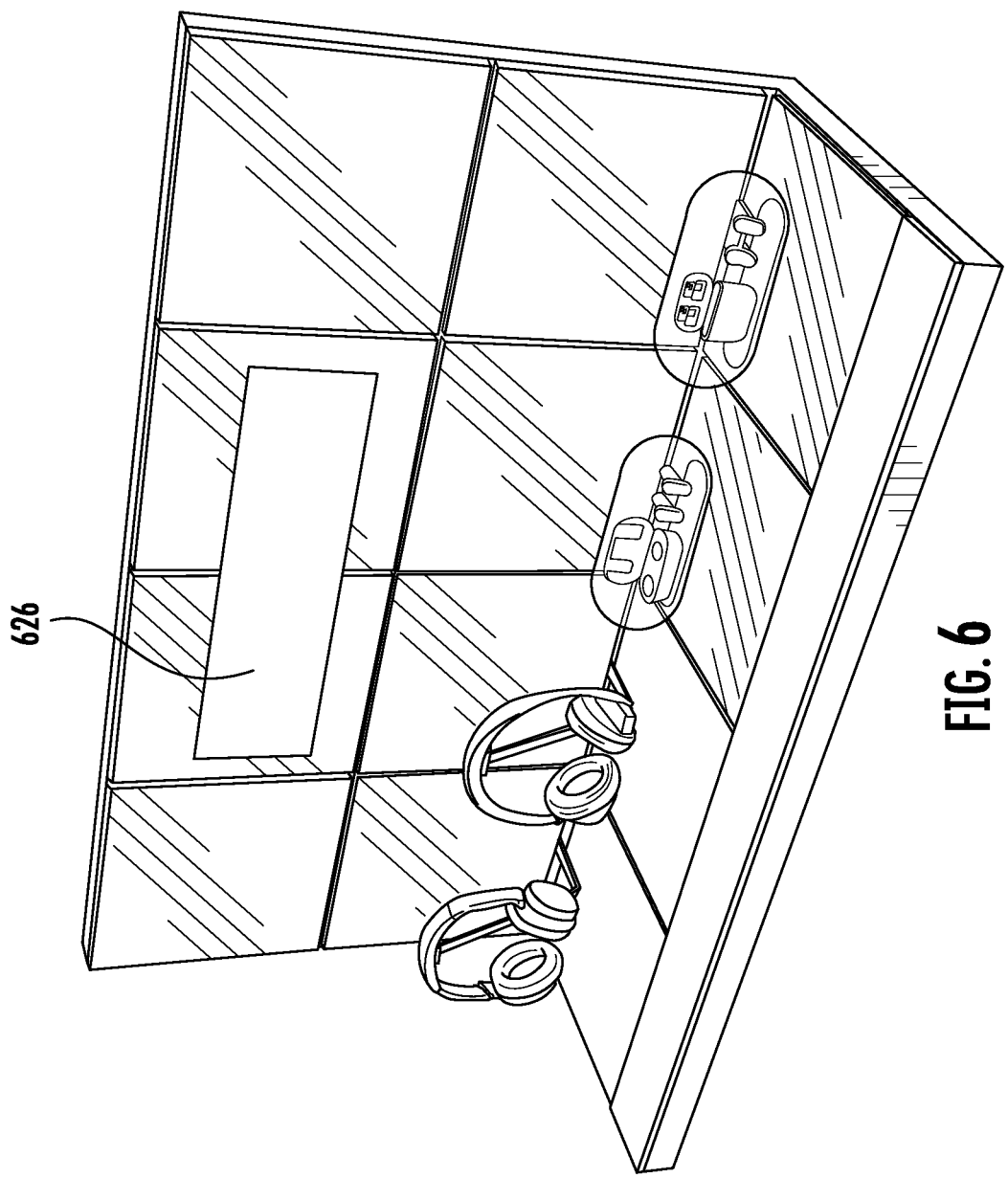
FIG. 6 is an isometric view of a retail display fixture in accordance with the second embodiment of the invention, illustrating the display of an image relevant to the displayed product and alternate placement of brand indicia.

FIG. 6 is an isometric view of a retail display fixture 200 also in accordance with the second embodiment of the invention, illustrating alternate placement of brand indicia 626. Such placement and size of indicia 626, if a component of the displayed digital image(s) can be static or dynamic, as desired.

Figure 7:
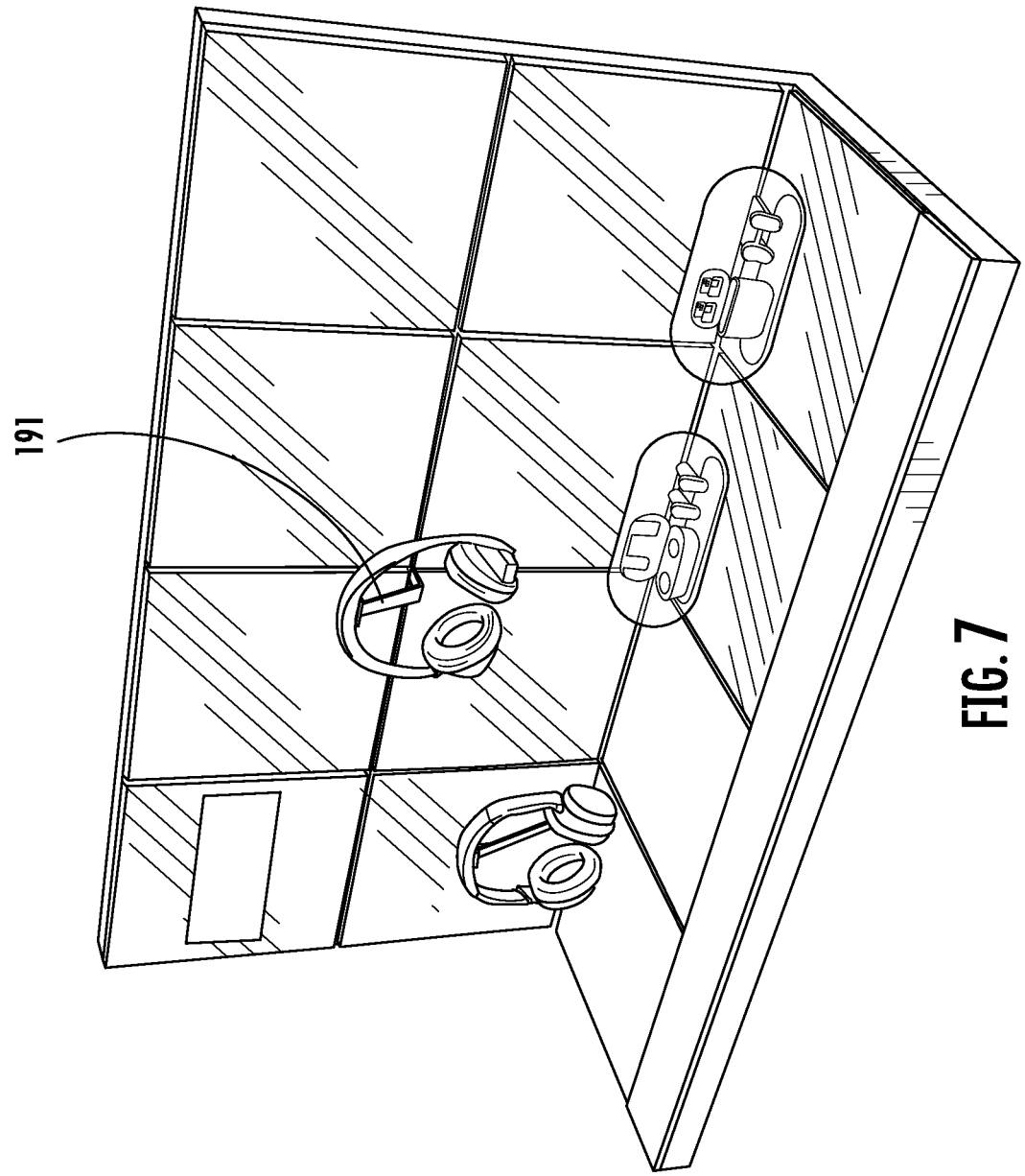
FIG. 7 is an isometric view of a retail display fixture in accordance with a second embodiment of the invention, illustrating the display of an image relevant to the displayed product, placement of brand indicia and alternate positioning of product display fixture accessories.

FIG. 7 is an isometric view of a retail display fixture, again in accordance with the second embodiment of the invention illustrating, in particular, alternate positioning of product display fixture accessories, such as the headset support arm 191. One advantage of the devices and systems of the present invention is flexible reconfigurability, depending on product space requirements or desired aesthetics.

Figure 8:
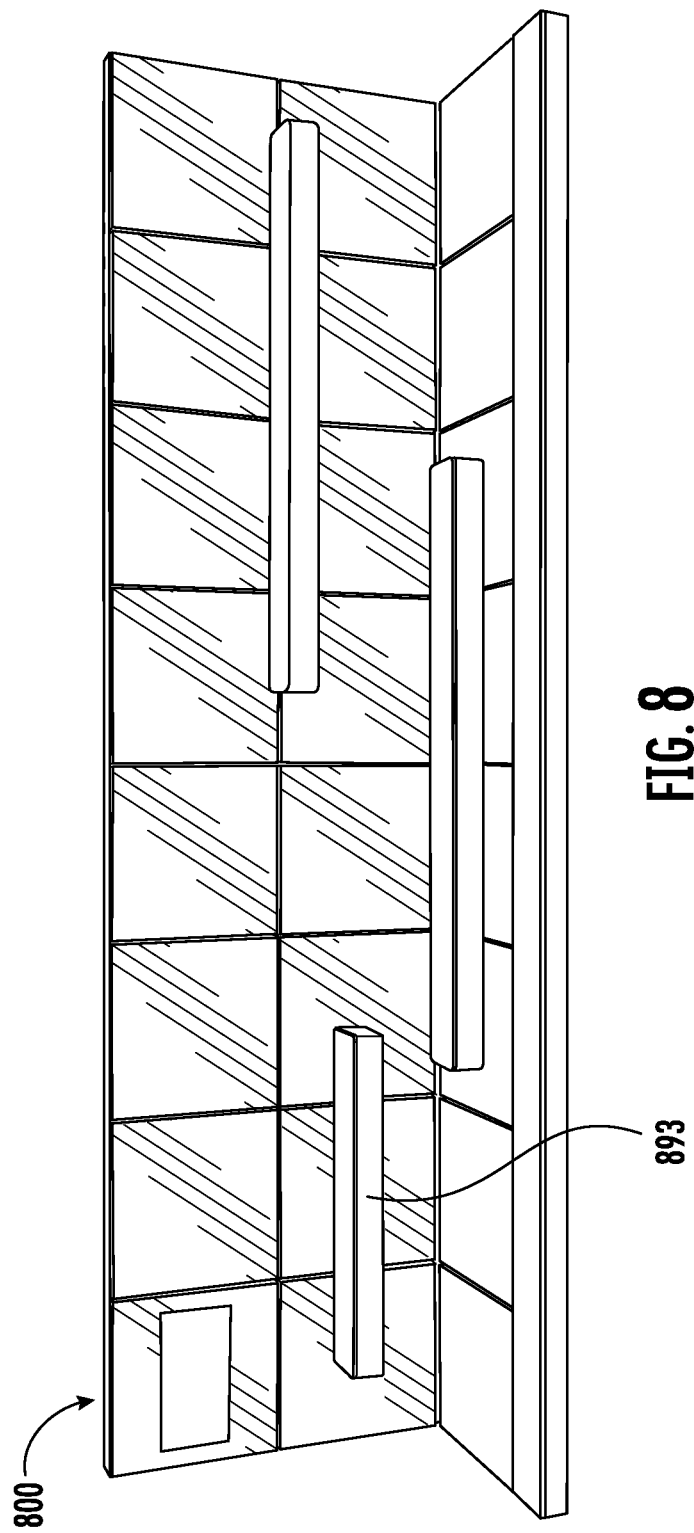
FIG. 8 is a front view of a retail display fixture in accordance with a fourth embodiment of the invention illustrating an elongated structure and floating product display shelves.

FIG. 8 is a front view of a retail display fixture 800 in accordance with a fourth embodiment of the invention illustrating an elongated structure and floating product display shelves 893. The floating display shelves 893 benefit from slim supports that fit between the surface modules and attach to the support structure behind them. The supports can have a generally horizontal form to fit in-between vertically adjacent surface modules, or alternatively they can have a generally vertical form to fit between horizontally adjacent surface modules. The shelves 893 themselves can be static—simply structural, or dynamic—having display and/or interactive functionality.

Figure 9:
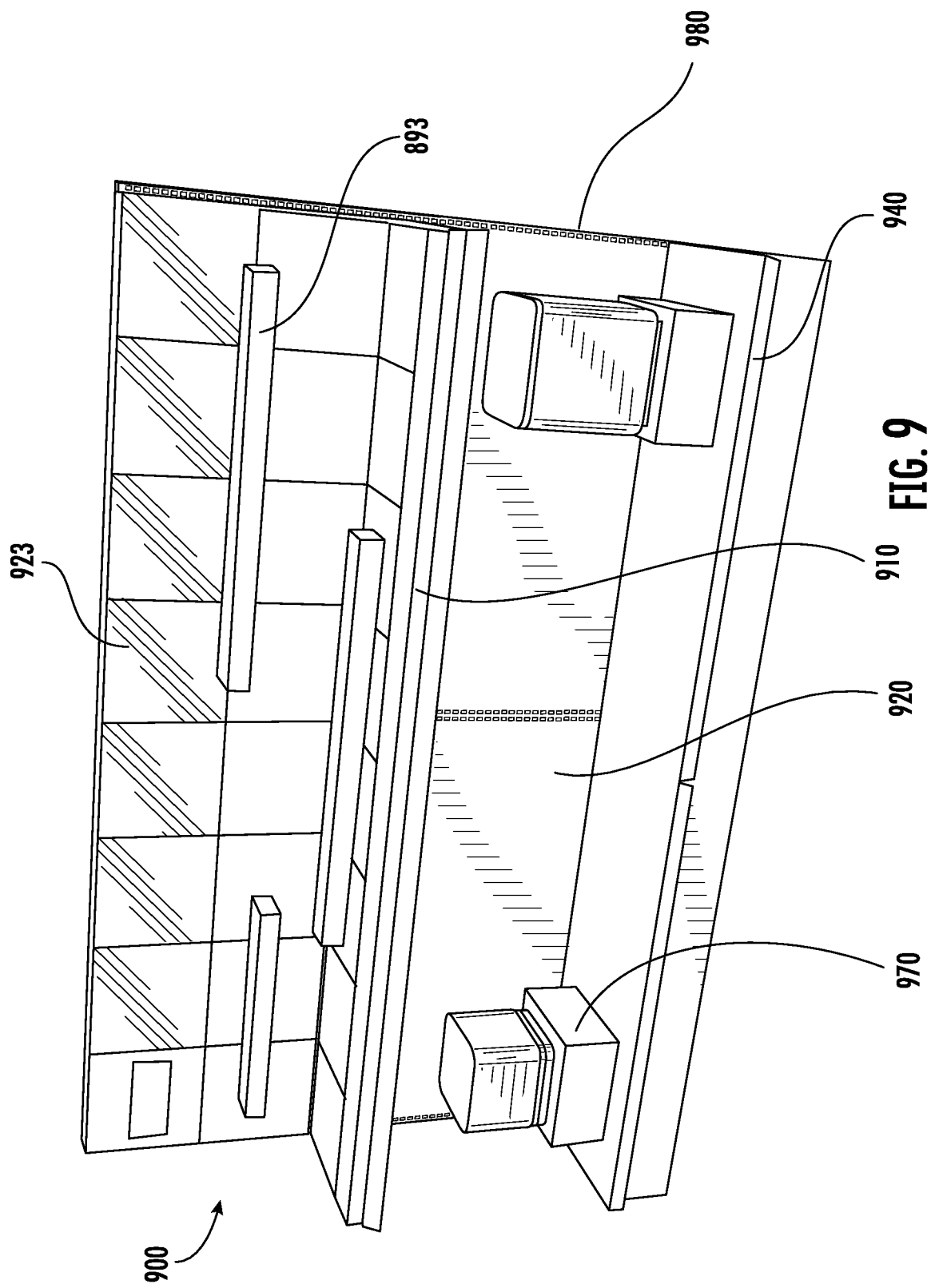
FIG. 9 is an isometric view of a retail display fixture in accordance with a fifth embodiment of the invention illustrating multiple shelves, floating product display shelves, modular display tiles, and coordinating modular display accessories.

FIG. 9 is an isometric view of a retail display fixture 900 in accordance with a fifth embodiment of the invention illustrating multiple shelves 910, 940, floating product display shelves 893, modular display tiles 923, and coordinating modular display accessories. In particular, dynamic display pedestals 970 are illustrated, which include a raised form and digital display elements. The illustrated embodiment allows for a taller overall structure, supported by way of a structural rear wall 920. Multiple vertical standards 980 are also provided to allow for additional shelving and fixture configurations.

Figure 10:
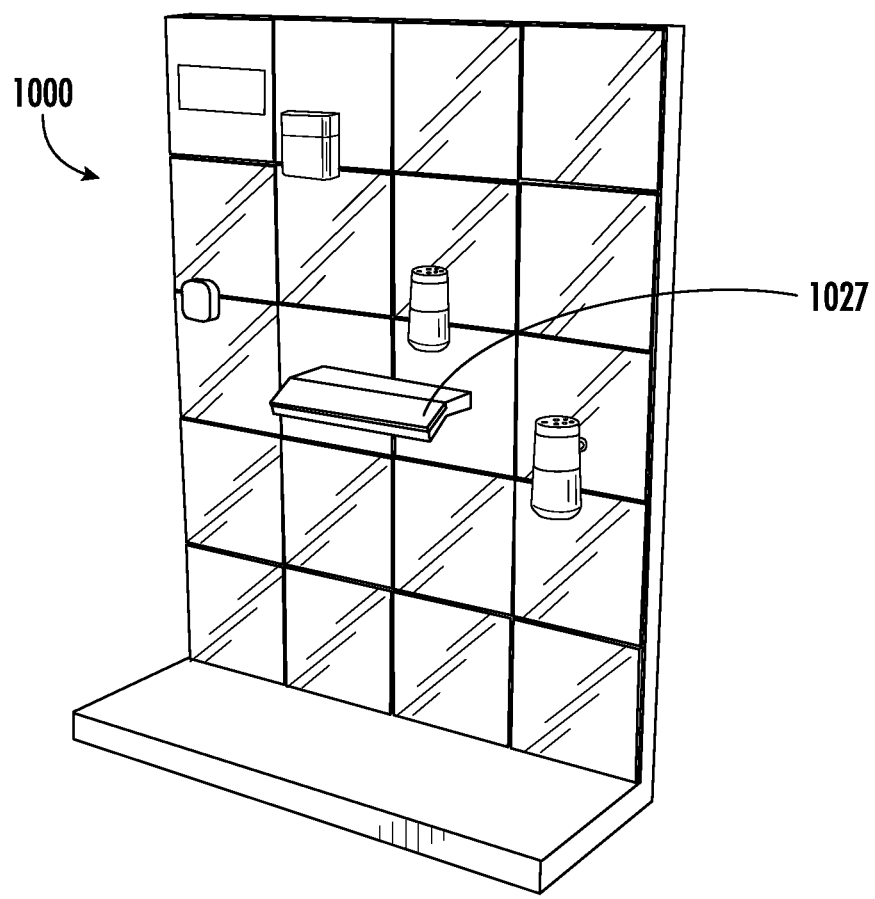
FIG. 10 is an isometric view of a retail display fixture in accordance with a sixth embodiment of the invention illustrating an upright structure and floating product display accessories.

FIG. 10 is an isometric view of a retail display fixture 1000 in accordance with a sixth embodiment of the invention illustrating an overall upright structure and featuring product display accessories that offer minimal visual impact so as to provide an illusion that the displayed product is simply floating in front of the display modules. A floating interactive panel 1027 can also be provided, to offer interactive features to a user, such as buttons, or other features, including those described herein in connection with other embodiments.

Figure 11:
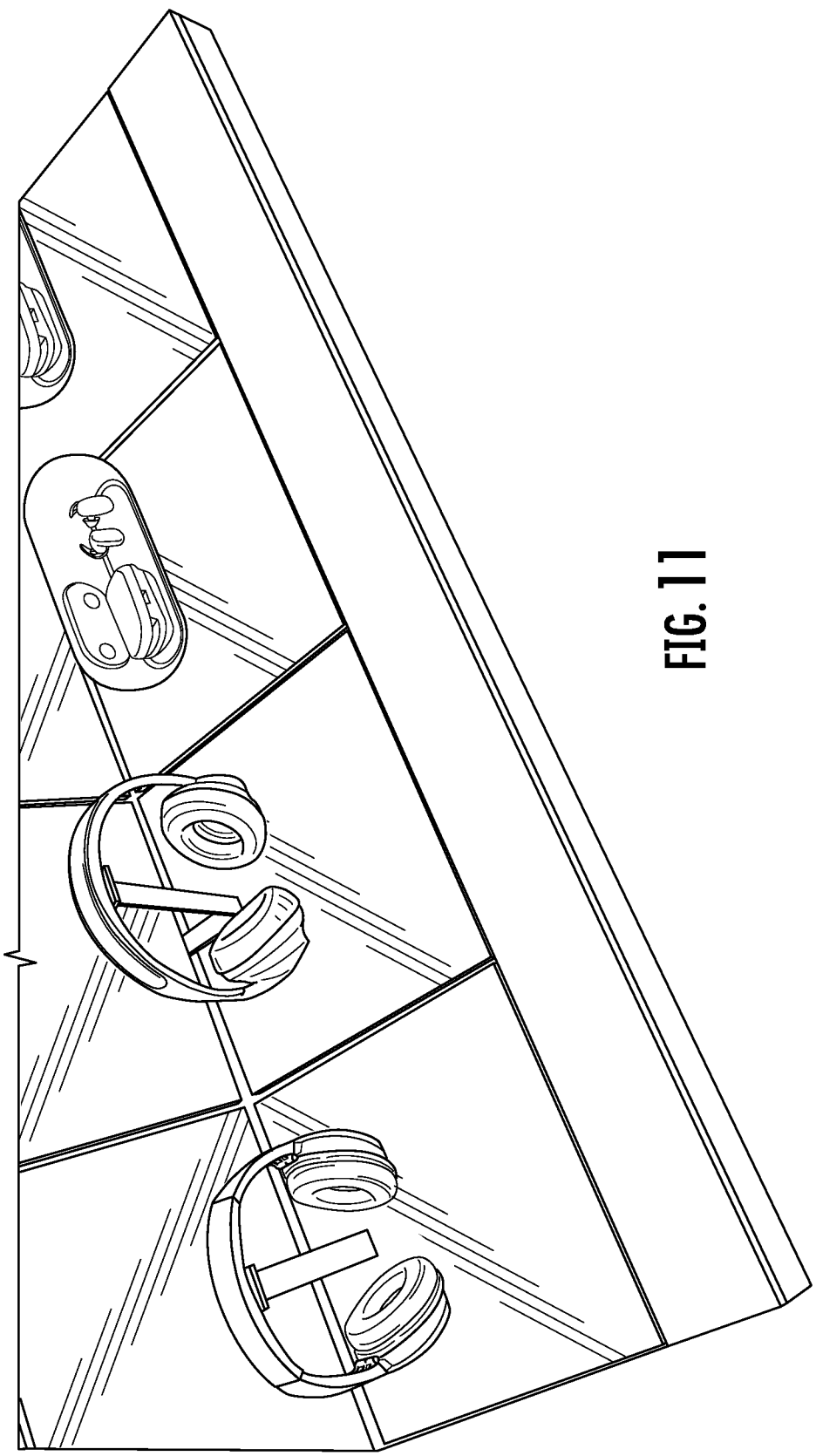
FIG. 11 is a partial isometric view of a retail display fixture in accordance with the invention illustrating specialized product display accessories.

FIG. 11 is an isometric detail view of a retail display fixture in accordance with the invention, providing a detailed view showing use of both horizontal, upward facing and vertical outward facing display modules. Further embodiments can include tables with wrap-around display, or structures that provide a roof or overhang, allowing horizontal downward-facing displays.

Figure 12:
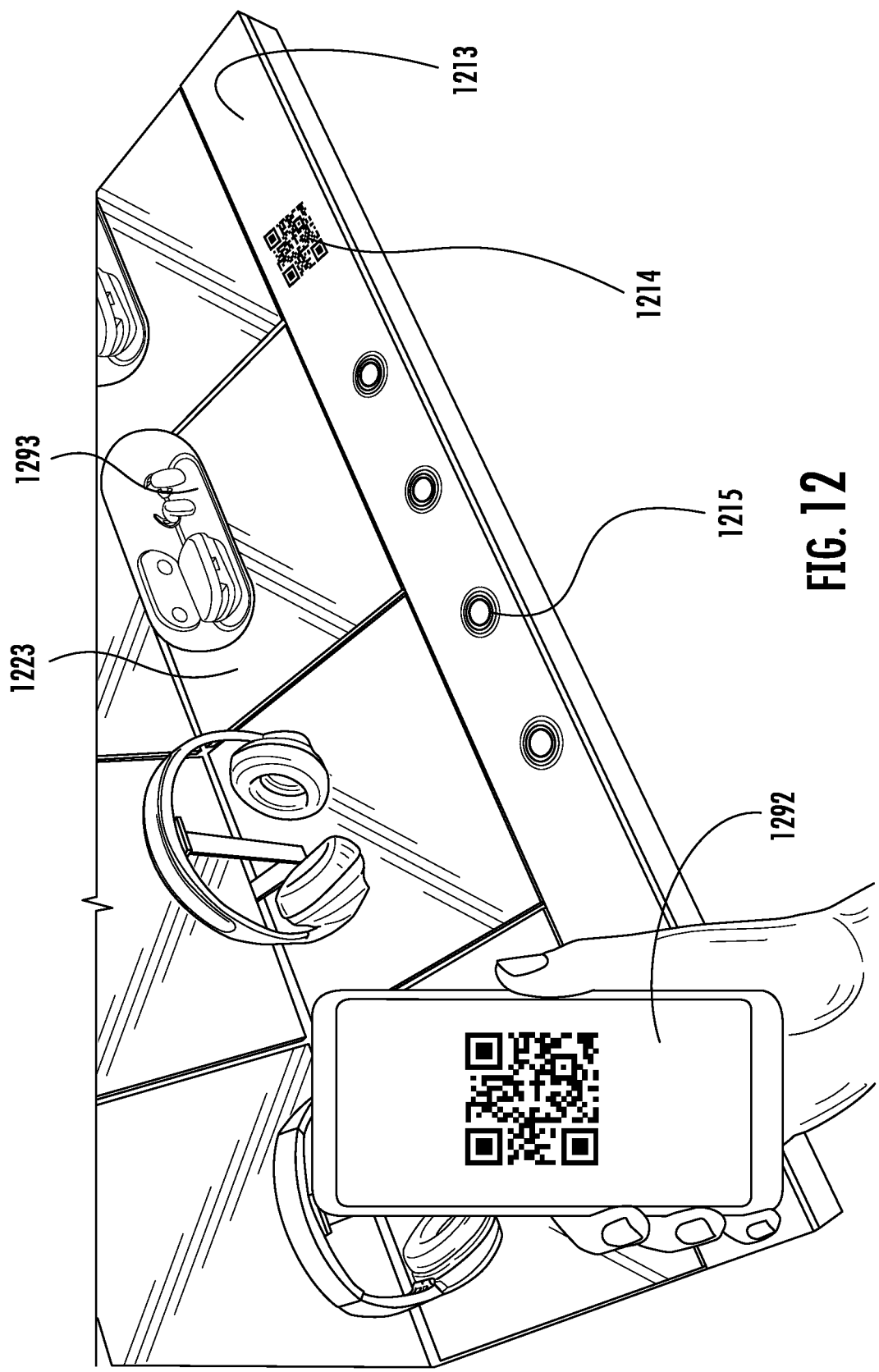
FIG. 12 is a partial isometric view of a retail display fixture in accordance with the invention illustrating interactive hardware and software components.

FIG. 12 is an isometric detail view of a retail display fixture in accordance with the invention illustrating interactive hardware and software components. Particularly, a front linear interactive module 1213 is provided, which includes both display 1214 and touch-response 1215 elements. In the illustrated embodiment, a user can press the buttons 1215 corresponding to different products in order to learn more, after which time, different predetermined media are provided to the display module(s) for the user to view. Moreover, a quick response ("QR") code can be displayed, which a user can scan with their mobile device 1292, in order to experience further interactive options. Such options can include touchless interaction with kiosk features, the user only touching their own mobile device. Alternative technologies such as NFC can alternatively or additionally be employed. Further interactive features that can be presented are illustrated in subsequent figures.

Also illustrated in FIG. 12 is an alternative display module 1223 that interfaces with or alternatively is integrated with a display capsule accessory 1283. The capsule 1283 can be connected to the display module 1223 by magnets or mechanical fasteners, and powered inductively or through electrical contacts, depending on precise implementation. Such power can be used to power lighting internal to the capsule, or other features, if desired. Sensors or sensing circuitry (e.g., detecting absence of a power draw) can further be incorporated. If intended to be removable by a user, a removal of the capsule 1283 can trigger a response from the system in the form of presentation of related information, for example. If not intended to be removed by a user, removal of the capsule 1283 can trigger an audible or silent alarm, to which retail employees can respond if necessary.

Figure 13:
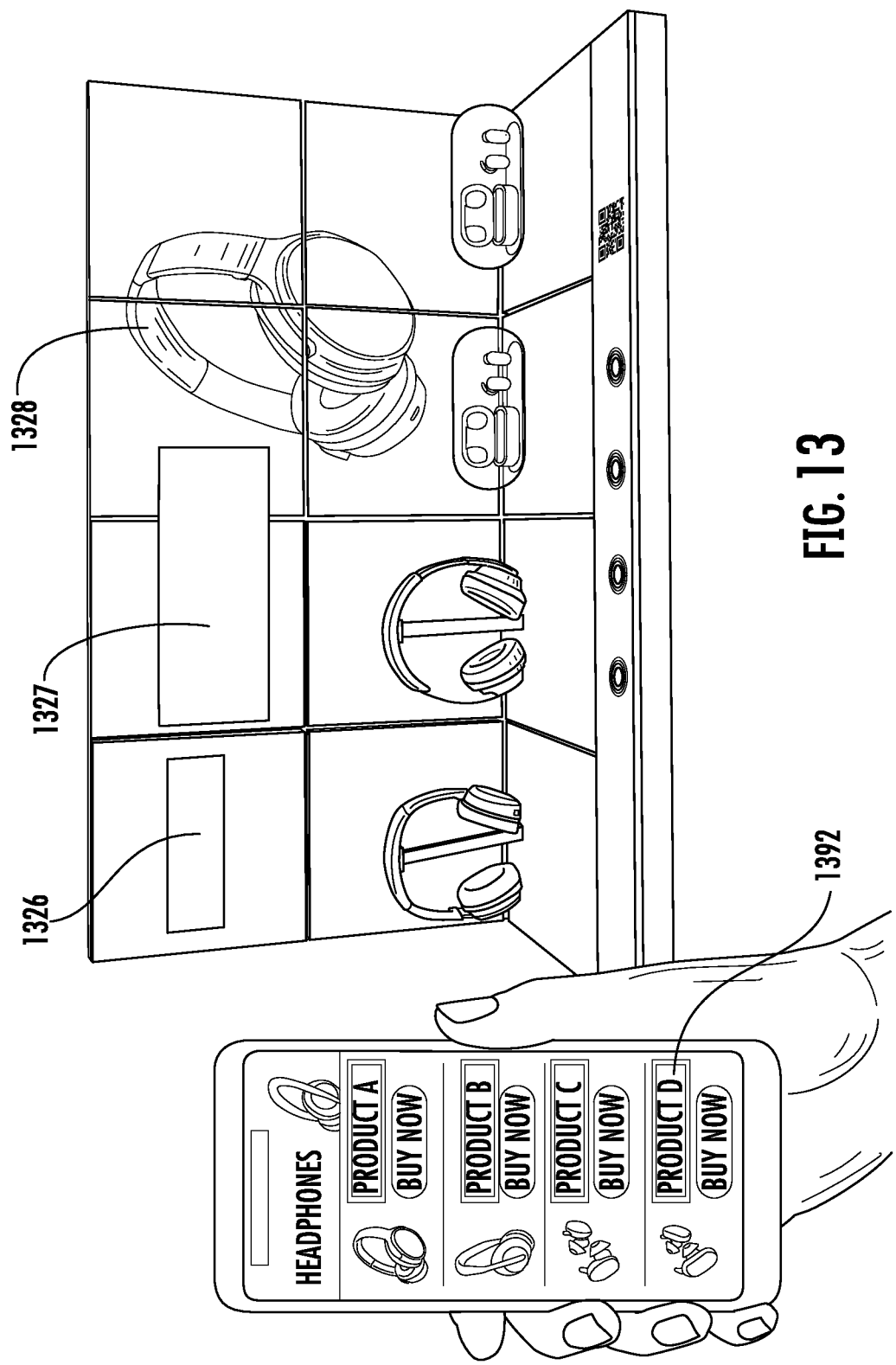
FIG. 13 is a front view of a retail display fixture in accordance with the invention illustrating interactive hardware and software components.

FIG. 13 illustrates one option for user interactivity after scanning a QR code, in which the displayed products are presented to the user on their mobile device 1392, through which they can learn more and/or purchase the products. The display modules of the retail fixture can also provide interactive graphics in response to user input, such as display of brand 1326 or product 1327 indicia, product information and/or images of the selected product 1328.

Figure 14:
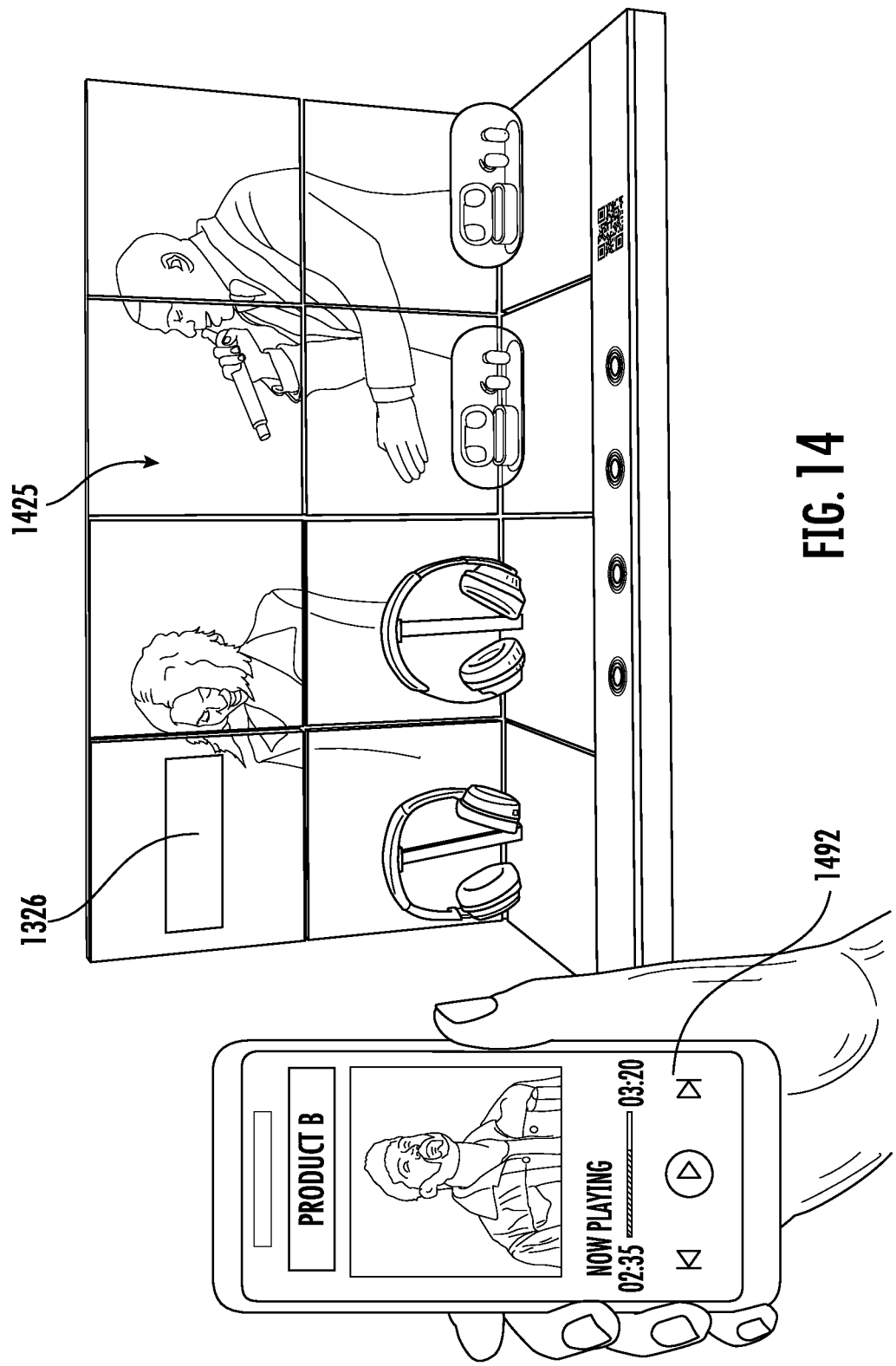
FIG. 14 is a front view of a retail display fixture in accordance with the invention illustrating interactive functionality.

FIG. 14 illustrates further interactive possibilities, wherein a user can select from available media 1492—in this case music and/or a related music video 1425 to be output to one of the displayed products (in this case "product B") and accompanying video on the display modules.

Figure 15:
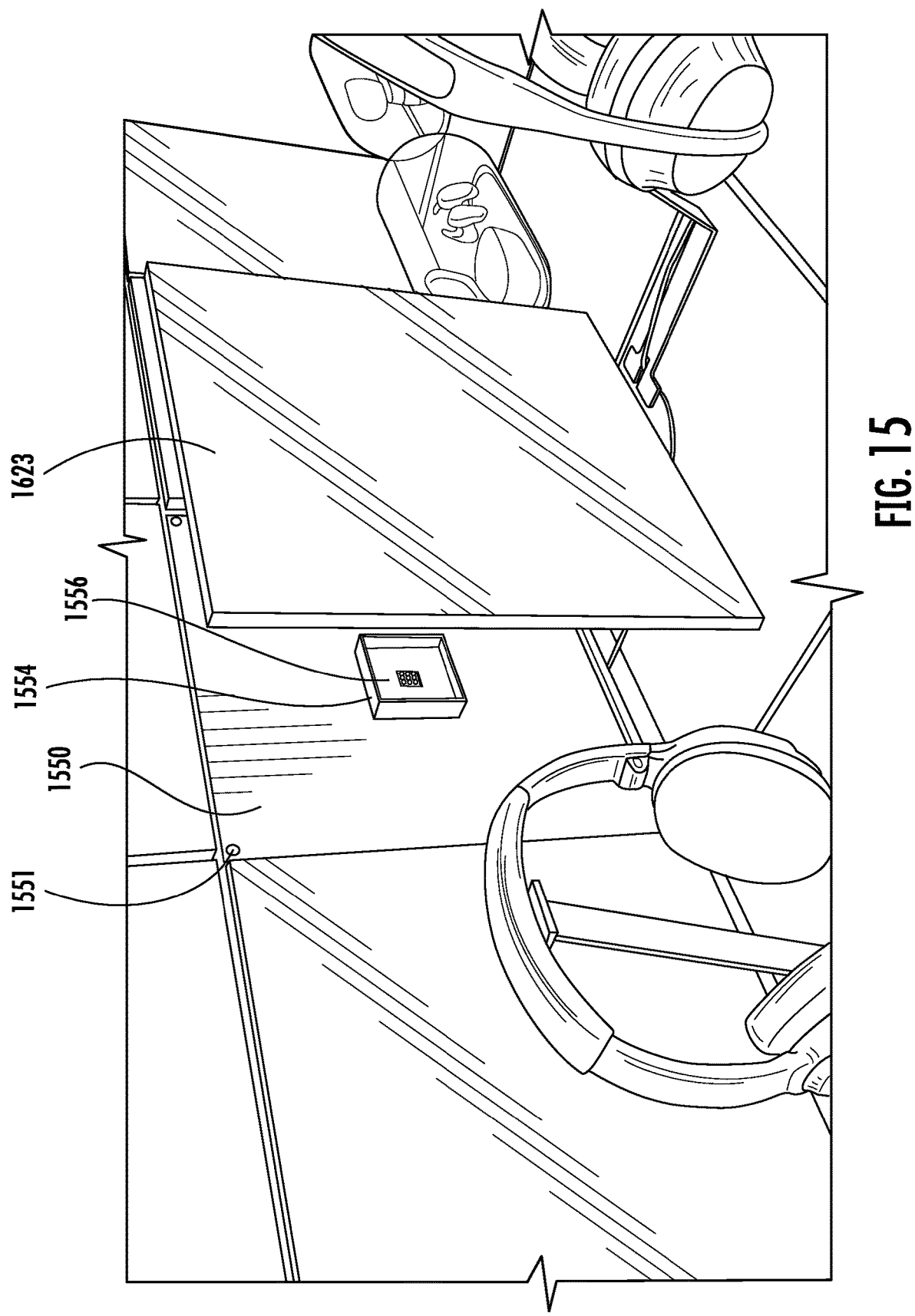
FIG. 15 is an isometric exploded view of a retail display fixture in accordance with the invention illustrating interconnecting elements between a base structure and modular, interchangeable surface panels.

FIG. 15 is an isometric exploded view illustrating interconnecting elements between a base structure and interchangeable surface modules/panels 1623. As illustrated, a designated area 1550 for each module is provided in the supportive structure. Mechanical attachments 1551 are provided for securing the modules 1623 in place, which can be magnetic, if desired, or alternatively can be snap-type, screw-type, cam-type, hook-and-loop type, repositionable or permanent adhesive-type, or other. Also illustrated is a connector 1554 having electrical and/or data contacts 1556, provided to power and/or control and/or receive data from or otherwise interact with the modules 1623.

Figure 16:
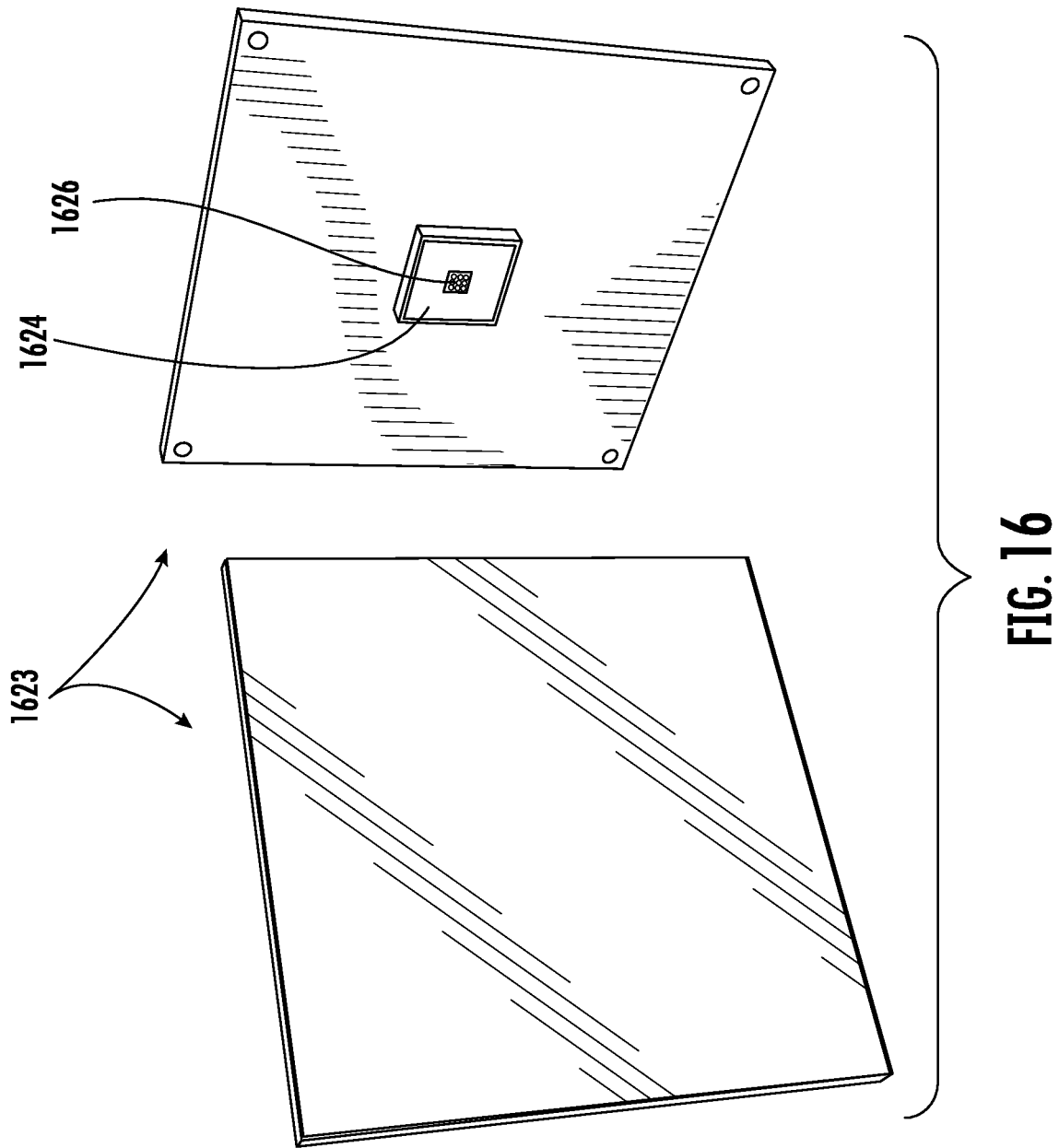
FIG. 16 is an isometric view illustrating front and back of a modular interchangeable digital display panel.

FIG. 16 is an isometric view illustrating front and back of an interchangeable digital display module/surface panel 1623, having on the rear surface thereof a connector 1624 with electrical/data contacts 1626 that interface with the connector 1554 and contacts 1556 of the system.

Figure 17:
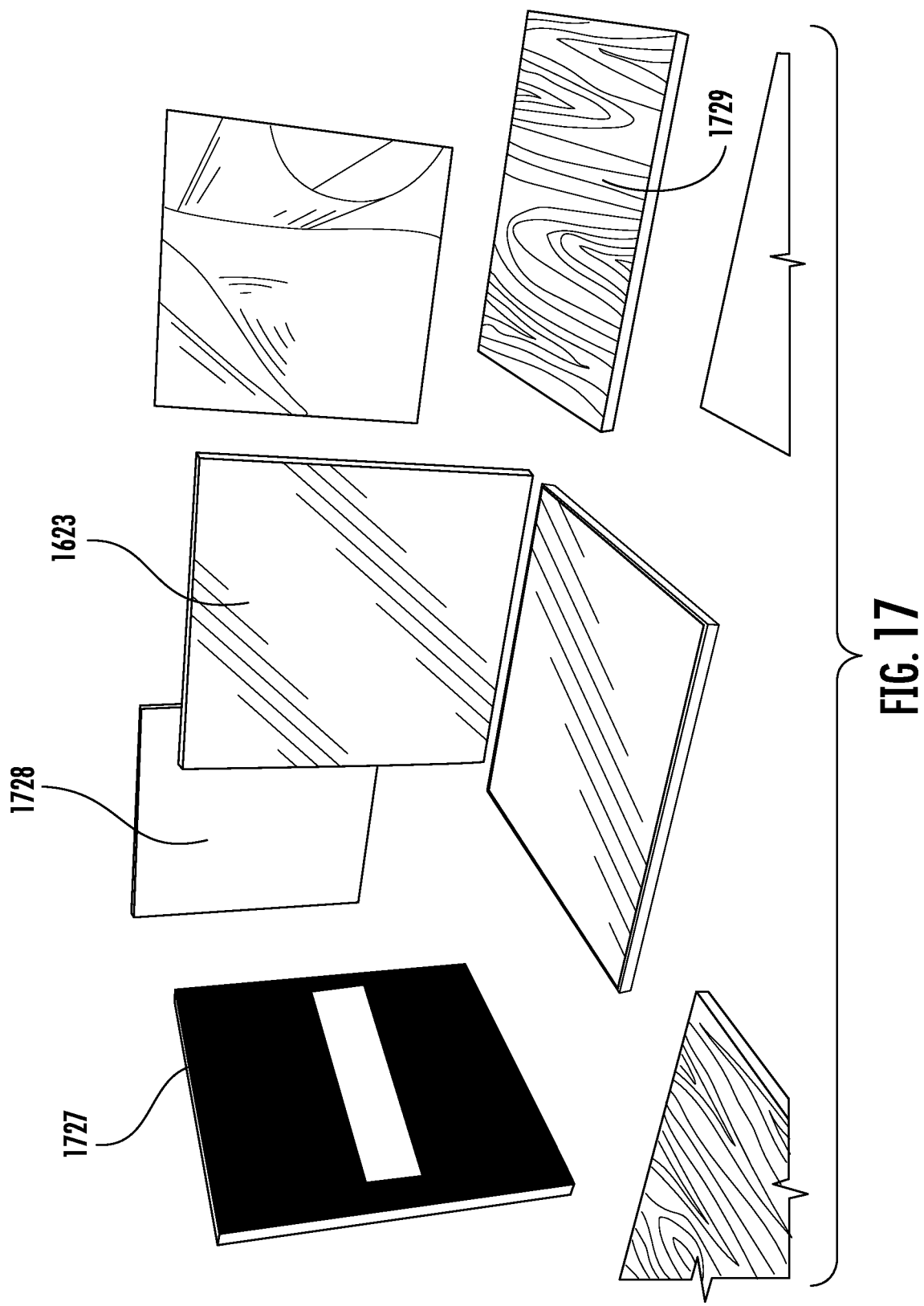
FIG. 17 is an isometric view illustrating various examples of modular, interchangeable surface panels.

FIG. 17 is an isometric view illustrating various examples of modular, interchangeable surface panels in accordance with the invention. These include the digital display modules 1623, which can be LCD, LED, OLED type, or of other suitable technology. The modules can also include powered, illuminated, modules 1727, which can incorporate, for example, brand indicia provided in 3-dimensional raised relief, if desired, to add variety and visual appeal. Other forms and colors of static display panels include different types of indicia panels, 1728, and modules of various material, such as composite, metal or wood 1729 in different types and finishes.

Figure 18:
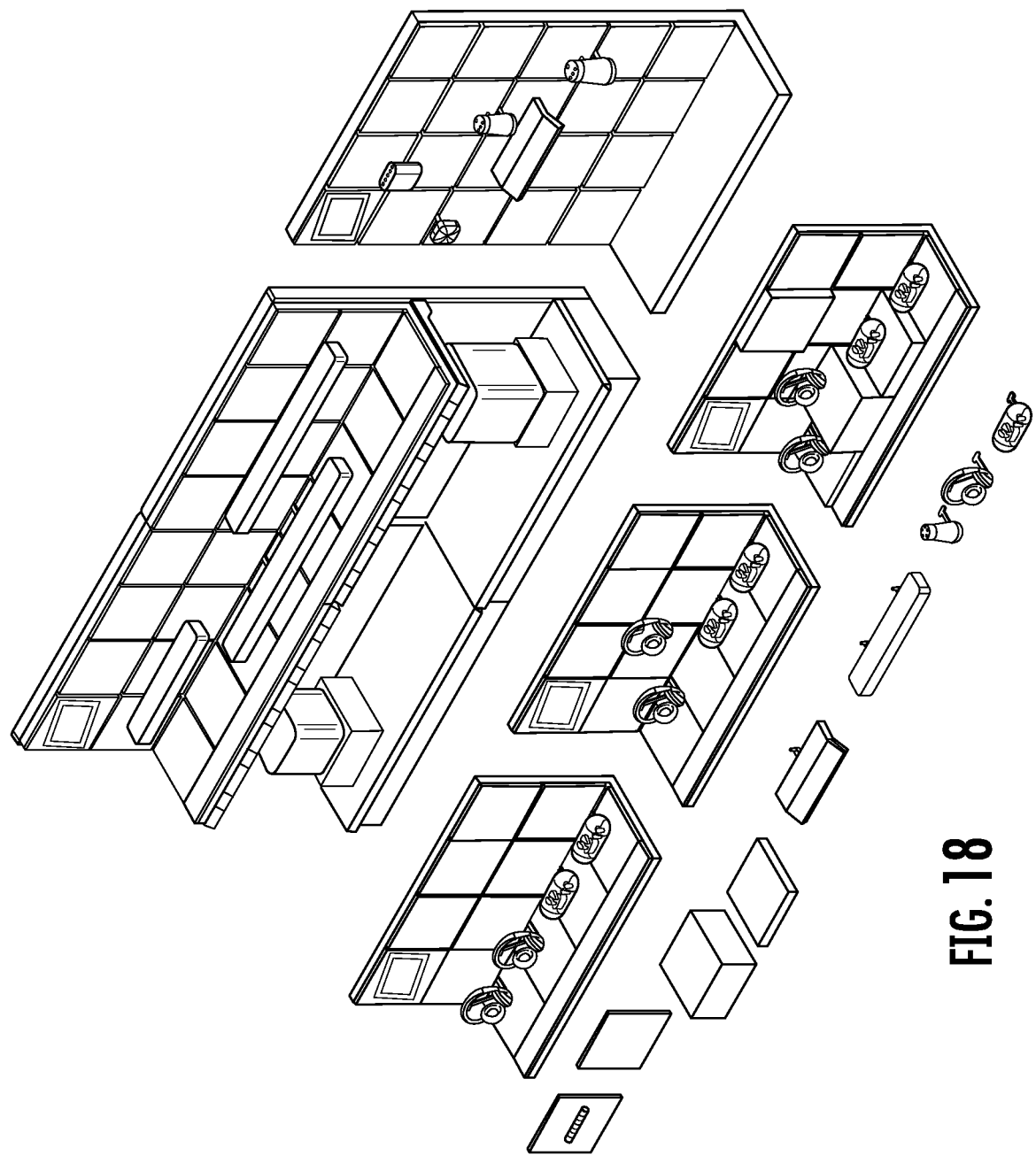
FIG. 18 is an isometric view illustrating various embodiments and configurations of retail display fixtures and accessories in accordance with the invention.

FIG. 18 is an isometric view illustrating various embodiments and configurations of retail display fixtures and accompanying accessories. Modules and accessories can also include audio components, such as integrated speakers to enhance a user's experience.

Figure 19:
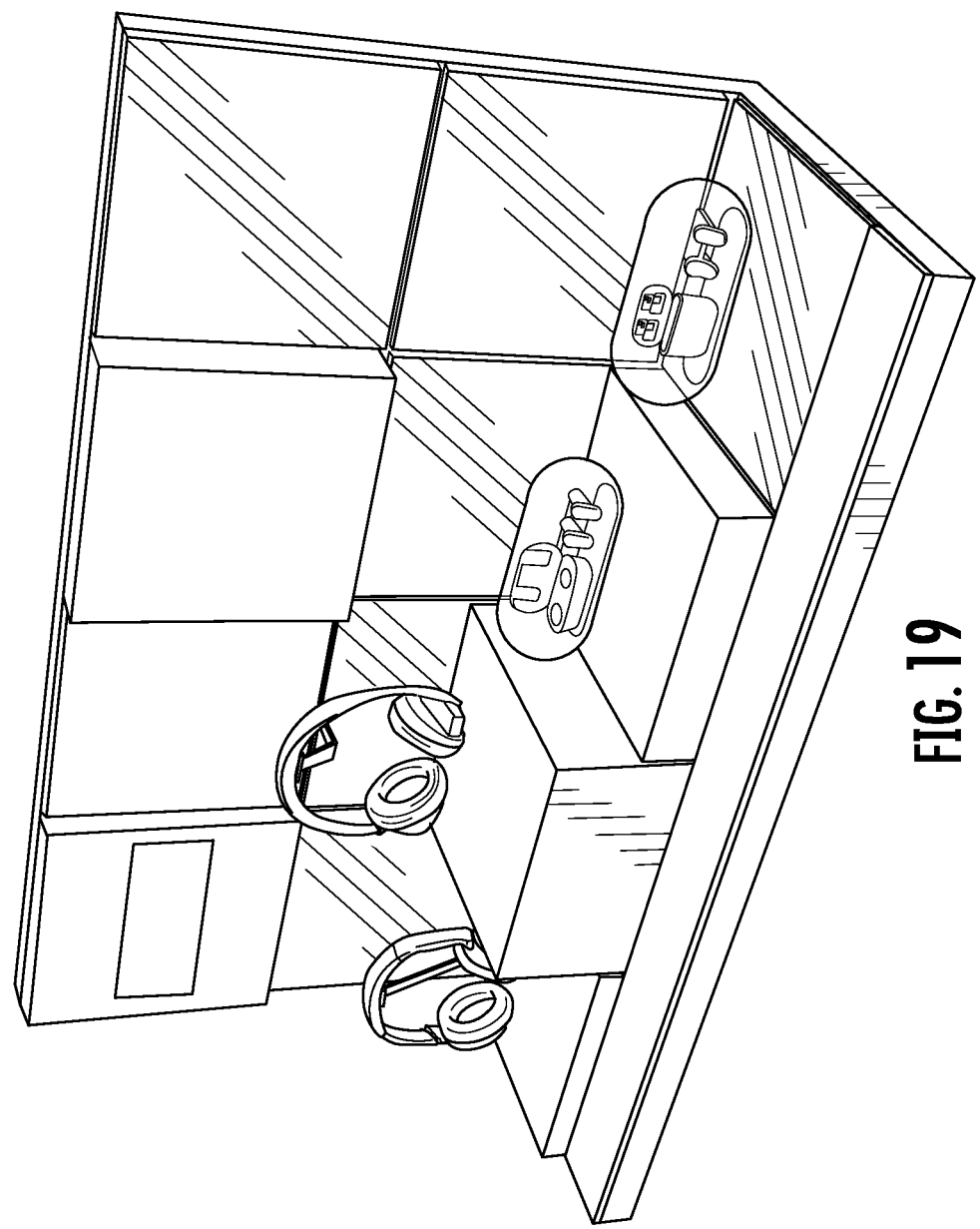
FIG. 19 is an isometric view of an alternate configuration of a retail display fixture in accordance with the invention illustrating various optional dimensional elements.

FIG. 19 is an isometric view of an alternate configuration of a retail display fixture in accordance with the invention illustrating various optional dimensional modules. As illustrated, some modules are provided with a thicker structure than others, lending an even more dynamic feel to the display fixture with increased dimensionality and therefore also increased visual interest.

Figure 20:
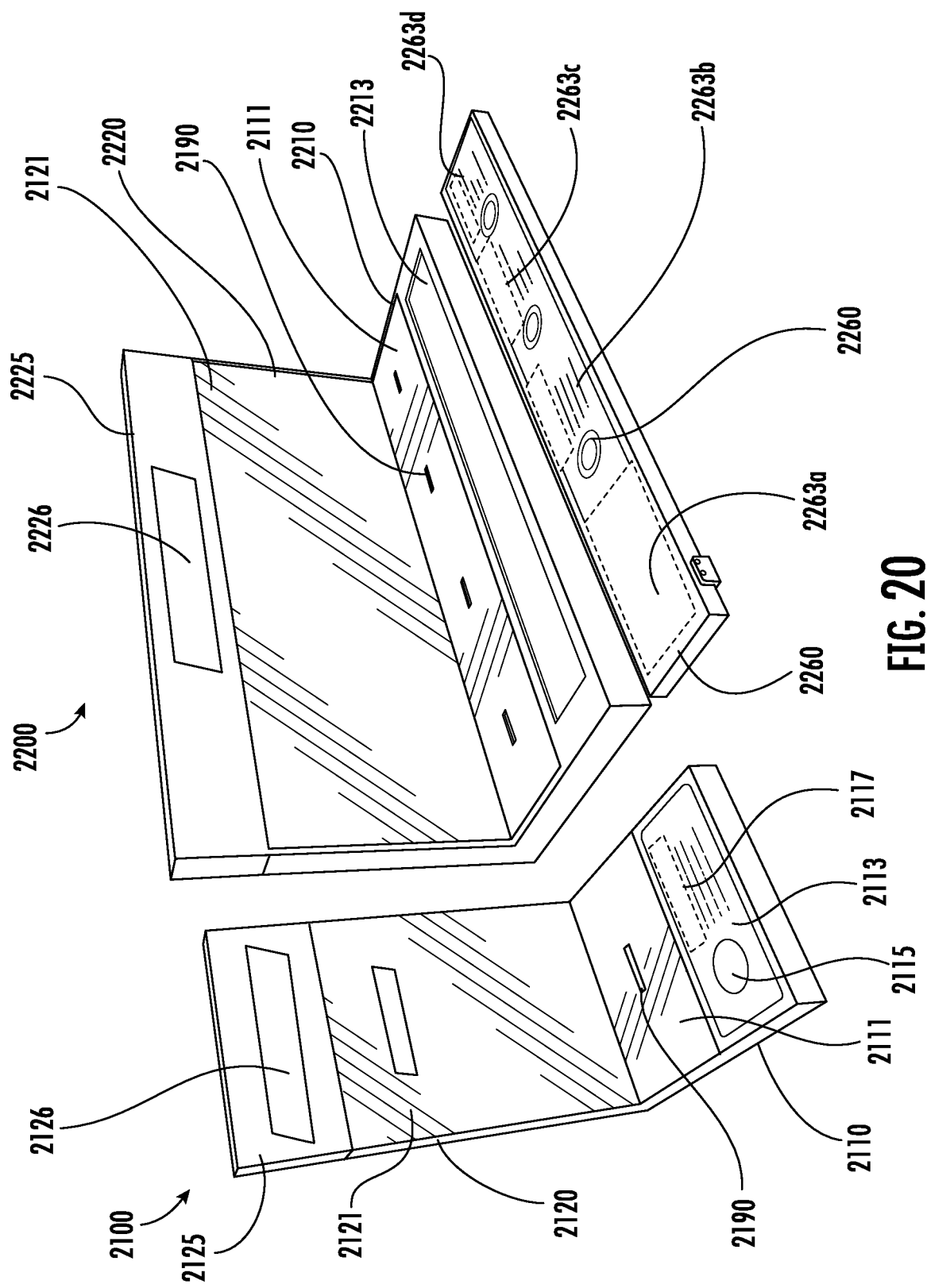
FIG. 20 is an isometric view of two modular product display systems with interchangeable tiles, or in short, a retail display fixtures, in accordance with seventh and eighth embodiments of the invention.

Illustrated in FIG. 20, in accordance with a further aspect of the present invention, a seventh embodiment of a retail fixture 2100 is provided, illustrating a basic three-dimensional form having a lower base 2110 and rear wall 2120, upon which are mounted modular interchangeable panels, 2111, and 2121, respectively. The modular interchangeable panels can include multiple display panels, which can be LCD, LED, OLED type, or of other suitable technology. In alternative embodiments, the modular interchangeable panels can be replaced with single, large panels if desired.

Also provided within the interchangeable panels 2121, or in alternate embodiments, a single large panel, are apertures 2190 formed within the display panels 2121 to permit passage of product display accessories directly through the panels 2121, thereby providing a completely seamless aesthetic. Such placement, directly below a product to be displayed can also enable use of standardized product display accessories, depending upon the implementation. The apertures 2190 can be dimensioned so as to closely conform to the shape of an intended product display accessory. Alternatively, the apertures 2190 can be dimensioned to be sufficiently large in each dimension to accept various sizes and shapes of product display accessories.

Moreover, the retail fixture 2100 can include an upper indicia portion 2125, to include indicia 2126 such as a brand logo, which logo can be illuminated as desired to produce the desired aesthetic effect.

Also illustrated is forward-mounted portion 2113, provided forward of panel 2111. This forward-mounted portion 2113 is positioned to facilitate easier interaction with the customer, including display of static product information 2117. One or more interactive features can be provided in connection with the forward and mounted portion 2113. Such interactive features can include interactive sensors 2115, such as proximity, touch, motion or RFID sensors, which can be incorporated in any module, panel or tile, but which may be particularly advantageous in panels physically closer to a user or customer, such as in forward-mounted panel 2113. In one preferred aspect, a touch sensor is provided within or below the forward-mounted panel 2113 in a designated area, which can be indicated in the printed material or otherwise indicated on the surface of the panel 2113. Example printed material is described below, in connection with FIG. 22. A simple prompt such as "Push to Learn More" is optionally provided. In accordance with one aspect, triggering of the respective sensor cues predetermined media to play relating to the respective product. Such media is then viewable by the user on the display comprised of rear panels 2221 and/or lower panels 2111. Corresponding audio can also be provided to the user if desired.

FIG. 20 further illustrates an eighth embodiment of a retail fixture 2200 in accordance with the invention, again illustrating a basic three-dimensional form having a lower base 2210 and rear wall 2220, upon which are mounted modular interchangeable panels, 2111, and 2121, respectively.

As with retail display fixture 2100, retail display fixture 2200 is provided with apertures 2190 formed within the display panels 2121 to permit passage of product display accessories directly through the panels 2121, thereby providing a completely seamless aesthetic. The apertures 2190 can be dimensioned so as to closely conform to the shape of an intended product display accessory. Alternatively, the apertures 2190 can be dimensioned to be sufficiently large in each dimension to accept various sizes and shapes of product display accessories.

Moreover, the retail fixture 2200 can include an upper indicia portion 2225, to include indicia 2226 such as a brand logo, which logo can be illuminated as desired to produce the desired aesthetic effect.

A forward-mounted portion 2213 is also provided forward of panels 2111. This forward-mounted portion 2213, is positioned to facilitate easier interaction with the customer, including display of static product information and one or more sensors, as desired. One or more interactive features can be provided in connection with the forward and mounted portion 2213. Such interactive features can include interactive sensors, such as proximity, touch, motion or RFID sensors.

Also illustrated in FIG. 20 is a separable customer-interaction panel 2260, which can be provided to allow flexibility in placement of fixtures, while still permitting close orientation of the panel 2260 and its features close to customers. If desired, the panel 2260 can be a duplicate of information and any sensors provided in portion 2213, but mounted at a different height or position, which can facilitate accessible use by customers of smaller stature or seated in a wheelchair, for example. Interactive area 2260 can be divided into multiple display and/or functional zones 2263a, 2263b, 2263c, 2263d, corresponding to different displayed products. The functional zones 2263a, 2263b, 2263c, 2263d can include printed material and/or interactive sensors as described above. Similarly, region 2213 can be divided into multiple display and/or functional zones including printed material and/or interactive sensors.

When media is triggered by a user by touching a sensor area 2265, for example, the media can be confined to only a region of the display/tiles 2111, 2121 in the area close to the product, or alternatively, the entire display area of retail fixture 2200 can be utilized, offering an increased immersive experience.

Figure 21:
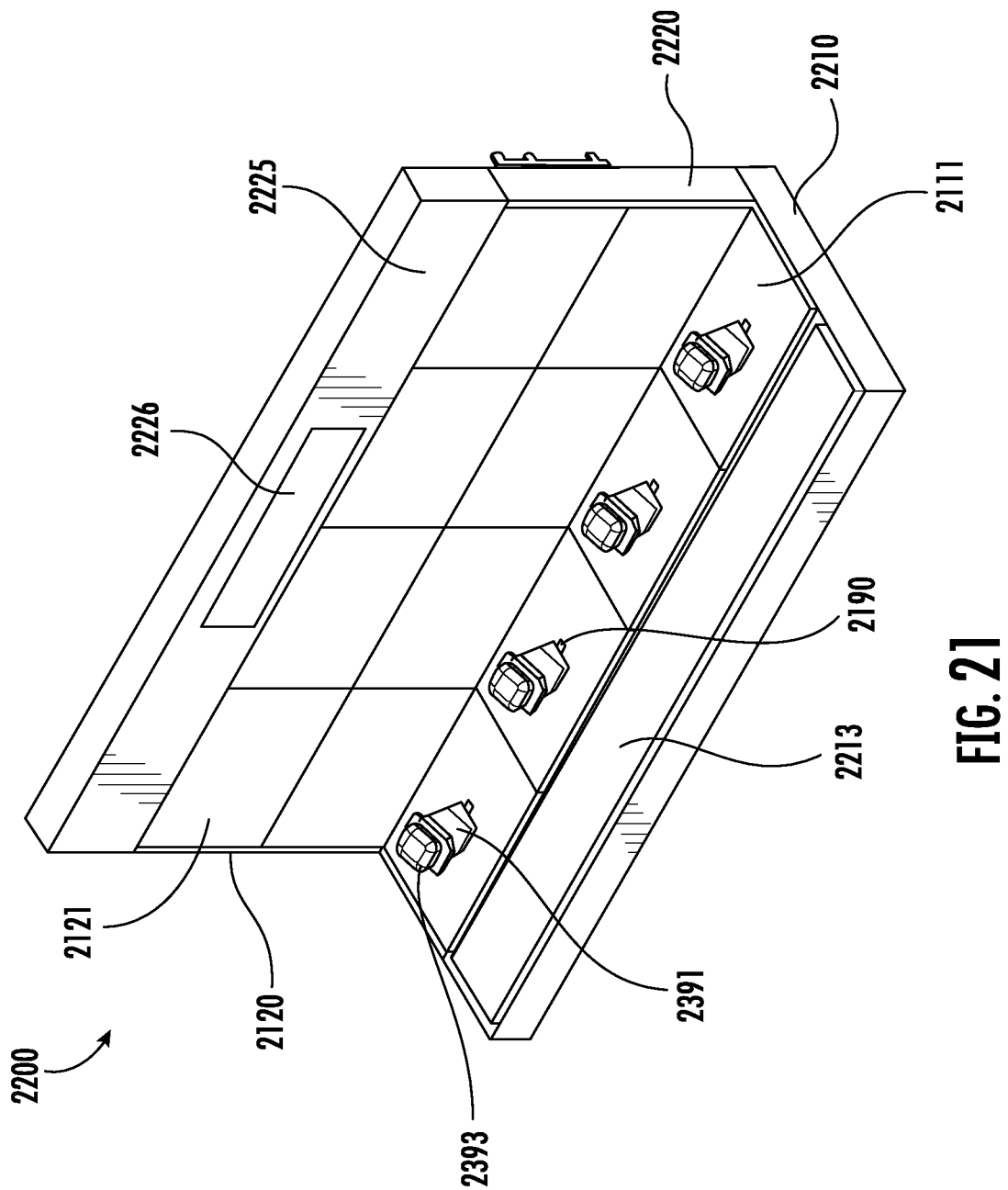
FIG. 21 is an isometric view of a retail display fixture in accordance with an eighth embodiment of the invention.

FIG. 21 is a further illustration of the retail fixture 2200 in accordance with the invention, further illustrating example products 2393 held by product display accessories 2391. In accordance with the invention, security features can be incorporated into the retail fixture 2200 and/or the display accessories 2391, which can be triggered in the event of unauthorized tampering.

Figure 22:
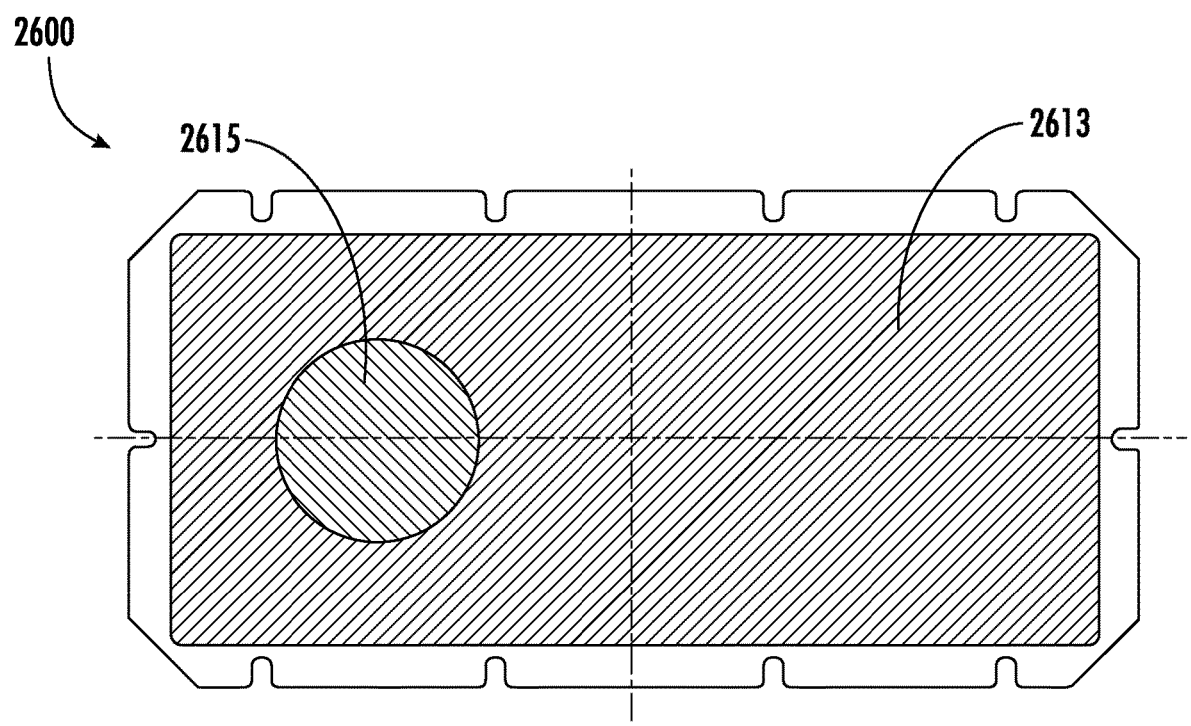
FIG. 22 is a top view of an example graphic insert for use with retail display fixtures in accordance with the invention.

FIG. 22 is a top view of an example graphic insert 2600 for use with retail display fixtures in accordance with the invention. In accordance with this embodiment, an area 2613 is freely provided for graphics, while a predetermined area 2615 is reserved for interactive purposes, such as for an indication of a touch sensor to trigger display of additional information or other informative content displayed on the screens of the subject retail display fixtures.

Figure 23:
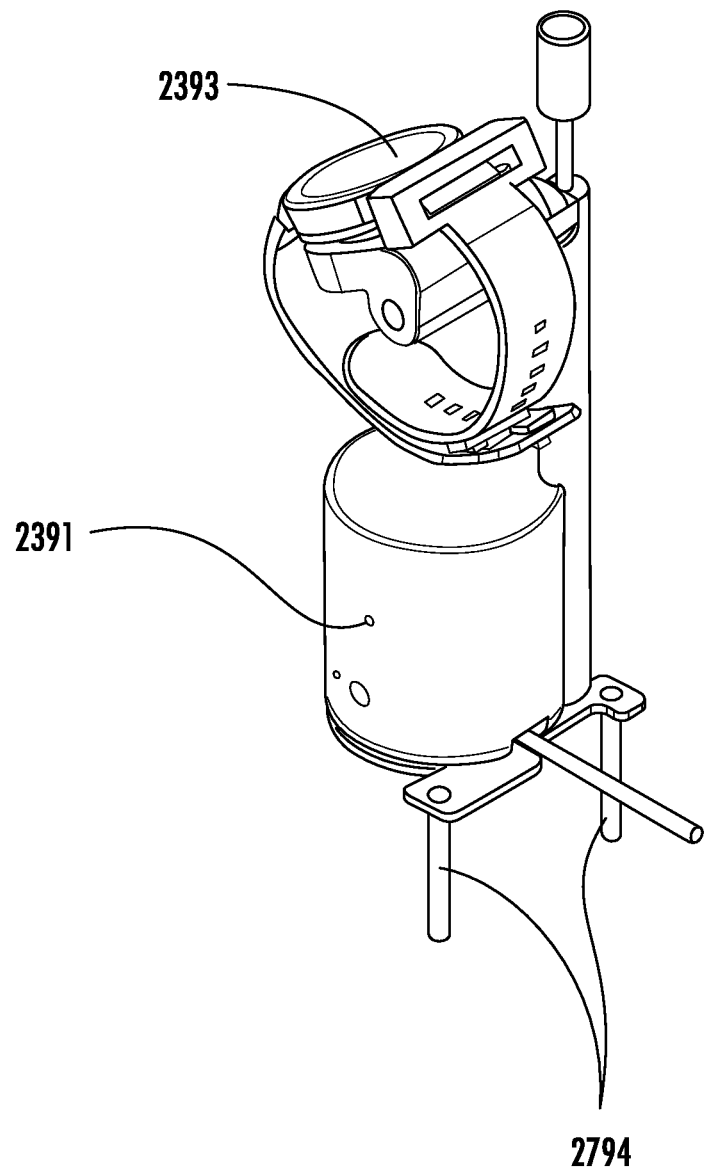
FIG. 23 is an isometric view of a product holder for use with retail display fixtures in accordance with the invention.

FIG. 23 is an isometric view of a product holder 2391 for use with retail display fixtures in accordance with the invention. The illustrated embodiment the product holder 2391 is designed to engage a product 2393, and includes securing posts 2794, which pass through apertures 2190 of the panels 2111 of the retail display fixtures 2100, 2200 described above. Power, data and security alarm connections can be provided along with the posts 2794 such that they pass through the apertures 2190, allowing for a tidy, uninterrupted aesthetic.

While the devices, systems and methods of the subject disclosure have been shown and described with reference to embodiments, those skilled in the art will readily appreciate that changes and/or modifications may be made thereto without departing from the spirit and scope of the subject disclosure.

What is claimed is:

1. A retail display fixture comprising:
   a plurality of interchangeable surface panels;
   a base structure having at least one outward-facing surface adapted and configured to receive the plurality of interchangeable surface panels; and
   at least one mechanical connector adapted and configured to secure the plurality of interchangeable surface panels to the base structure,
   wherein at least one of the interchangeable surface panels is a digital display, wherein an aperture is formed in the at least one digital display, the aperture being adapted and configured to permit penetration of product display hardware through the at least one digital display.

2. The retail display fixture of claim 1, further comprising:
   a locking element in connection with the base structure adapted and configured to engage said product display hardware.

3. The retail display fixture of claim 1, further comprising at least one electrical connector adapted and configured to provide electrical power to at least one of the plurality of interchangeable panels.

4. The retail display fixture of claim 1, further comprising at least one data connector adapted and configured to provide data from a controller to at least one of the plurality of interchangeable panels.

5. The retail display fixture of claim 1, wherein the digital display is adapted and configured to receive an input image signal from a controller.

6. The retail display fixture of claim 1, wherein at least one of the interchangeable surface panels is an opaque panel.

7. The retail display fixture of claim 1, wherein at least one of the interchangeable surface panels includes an illumination source.

8. The retail display fixture of claim 1, wherein the at least one mechanical connector includes a magnetic portion.

9. The retail display fixture of claim 1, wherein at least one of the interchangeable surface panels includes at least one sensor.

10. The retail display fixture of claim 9, wherein the sensor is touch-sensitive.

11. The retail display fixture of claim 1, wherein at least one of the interchangeable surface panels includes a printed insert.

12. The retail display fixture of claim 1, further comprising a separable interactive panel.

13. The retail display fixture of claim 1, further comprising a quick response-code (QR code) on the retail display fixture to permit user interaction with the retail display fixture.

14. The retail display fixture of claim 13, the retail display fixture being adapted and configured to display user-selected content in response to user input on a user device.

15. A retail display fixture comprising:
a plurality of interchangeable surface display panels;
a base structure having at least one outward-facing surface adapted and configured to receive the plurality of interchangeable surface display panels;
at least one mechanical connector adapted and configured to secure the plurality of interchangeable surface display panels to the base structure;
wherein the plurality of interchangeable surface display panels are placed on the base structure spaced apart from one another; and
a display accessory support structure operatively connected to the base structure and configure to visually unobtrusively pass through a space defined between adjacent surface display panels to display an accessory thereon,
wherein the plurality of interchangeable surface display panels are configured to display an image corresponding to a product held on the display accessory support structure.

16. A retail display fixture comprising:
a base structure having a first outward-facing surface extending generally vertically and at least a first upward-facing surface extending generally horizontally from the first outward facing surface;
a first plurality of interchangeable surface display panels operatively connected to the first outward-facing surface and a second plurality of interchangeable surface display panels operatively connected to the first upward-facing surface; and
at least one mechanical connector adapted and configured to secure the plurality of interchangeable surface panels to the base structure,
wherein the first plurality of interchangeable surface display panels defines a first display zone configured to display at least a first image and the second plurality of interchangeable surface display panels defines a second display zone configured to display at least a second image,
wherein the second plurality of interchangeable surface display panels on the first upward-facing surface include display panels for displaying at least the second image and touch-response elements for allowing a user to interact with the display fixture by physically touching the display fixture.

17. The retail display fixture of claim 16, further comprising:
a second outward-facing surface extending generally vertically from the first outward-facing surface and/or the first upward-facing surface, and
a third plurality of interchangeable surface display panels operatively connected to the second outward-facing surface, wherein the third plurality of interchangeable surface display panels defines a third display zone configured to display at least a third image, wherein the second outward facing surface is configured to wrap around the retail display fixture.

18. The retail display fixture of claim 16, wherein the first image corresponds to a first product physically present for display on the display fixture and wherein the second image corresponds to a second product physically present for display on the display fixture, wherein the second image is different from the first image and wherein the second product is different from the first product.

19. The retail display figure of claim 16, wherein each display panel in the first display zone and the second display zone is configured to display an individual image, wherein each of the individual images form a single composite image.

20. The retail display fixture of claim 15, further comprising, a plurality of a display accessory support structures operatively connected to the base structure, each display accessory support structure configured to support a respective product, wherein each surface display panel of the plurality of interchangeable surface display panels are configured to display a respective image corresponding to the respective product held on the display accessory support structure adjacent the display accessory support structure.

* * * * *